United States Patent
Nomura et al.

(10) Patent No.: US 9,613,063 B2
(45) Date of Patent: Apr. 4, 2017

(54) CONTENT TRANSMISSION DEVICE, CONTENT TRANSMISSION METHOD, AND CONTENT TRANSMISSION PROGRAM

(75) Inventors: Masaru Nomura, Tokyo (JP); Yoshinari Higuchi, Tokyo (JP)

(73) Assignee: Sony Corporation (JP)

( * ) Notice: Subject to any disclaimer, the term of this patent is extended or adjusted under 35 U.S.C. 154(b) by 849 days.

(21) Appl. No.: 12/217,551

(22) Filed: Jul. 7, 2008

(65) Prior Publication Data
US 2009/0019392 A1 Jan. 15, 2009

(30) Foreign Application Priority Data
Jul. 11, 2007 (JP) ................. P2007-182632

(51) Int. Cl.
*G06F 3/048* (2013.01)
*G06F 17/30* (2006.01)

(52) U.S. Cl.
CPC ............... *G06F 17/30274* (2013.01)

(58) Field of Classification Search
CPC ................................... G06F 17/30274
USPC .................................. 715/810, 791
See application file for complete search history.

(56) References Cited

U.S. PATENT DOCUMENTS

| | | | | |
|---|---|---|---|---|
| 5,231,679 A * | 7/1993 | Matsuura et al. | ............ | 382/232 |
| 5,848,246 A * | 12/1998 | Gish | ............. | G06F 9/5027 709/203 |
| 5,968,132 A * | 10/1999 | Tokunaga et al. | ............ | 709/247 |
| 6,101,263 A * | 8/2000 | Shimizu et al. | ............. | 382/100 |
| 6,434,598 B1 * | 8/2002 | Gish | ............ | G06F 8/24 709/201 |
| 6,512,599 B1 * | 1/2003 | Hattori | ............. | 358/442 |
| 6,671,567 B1 * | 12/2003 | Dwyer et al. | ............. | 700/94 |
| 6,801,905 B2 * | 10/2004 | Andrei | ............. | G06F 17/30454 |
| 6,816,870 B1 * | 11/2004 | Nishimura | ............. | G06F 3/0338 |
| 6,907,397 B2 * | 6/2005 | Kryze et al. | ............. | 704/251 |
| 6,931,159 B2 * | 8/2005 | Ridge | ............. | 382/246 |
| 7,107,280 B2 * | 9/2006 | Tomic | ............. | G06F 17/30286 707/783 |
| 7,142,328 B2 * | 11/2006 | Ohmori | ............. | 358/1.2 |
| 7,146,575 B2 * | 12/2006 | Manolis et al. | ............. | 715/838 |
| 7,154,538 B1 * | 12/2006 | Fukasawa et al. | .......... | 348/211.3 |
| 7,158,172 B2 * | 1/2007 | Kawaoka et al. | .......... | 348/211.1 |

(Continued)

FOREIGN PATENT DOCUMENTS

| | | | |
|---|---|---|---|
| JP | 6-216936 A | 8/1994 |
| JP | 9-062473 A | 3/1997 |

(Continued)

*Primary Examiner* — Jung-Mu Chuang
(74) *Attorney, Agent, or Firm* — Lerner, David, Littenberg, Krumholz & Mentlik, LLP

(57) ABSTRACT

When the user selects one or more thumbnail images G and one uploading destination from an image list screen GW, an image selection tray PT showing the thumbnail images G and an uploading screen AW corresponding to a web browser are displayed. When the user selects the thumbnail images G from the image selection tray PT, the image paths GP corresponding to the selected thumbnail images G are acquired. In this manner, the image files can be uploaded only by requiring the user to paste the acquired image paths in image path input sections GR on the uploading screen AW. Accordingly, the user can upload image files to an optional uploading destination by simple operation.

18 Claims, 11 Drawing Sheets

(56) References Cited

U.S. PATENT DOCUMENTS

| | | | | |
|---|---|---|---|---|
| 7,206,806 B2* | 4/2007 | Pineau | | 709/203 |
| 7,243,079 B1* | 7/2007 | Manolis et al. | | 705/26.81 |
| 7,269,800 B2* | 9/2007 | Manolis et al. | | 715/838 |
| 7,271,780 B2* | 9/2007 | Cok | | 345/1.1 |
| 7,272,815 B1* | 9/2007 | Eldridge | | G06F 8/71 |
| | | | | 707/999.009 |
| 7,281,048 B2* | 10/2007 | Watanabe | | 709/229 |
| 7,287,088 B1* | 10/2007 | Anderson | | 709/235 |
| 7,296,025 B2* | 11/2007 | Kung et al. | | 707/608 |
| 7,302,254 B2* | 11/2007 | Valloppillil | | 455/414.1 |
| 7,362,352 B2* | 4/2008 | Ueyama | | 348/207.1 |
| 7,392,208 B2* | 6/2008 | Morse et al. | | 705/27.2 |
| 7,418,737 B2* | 8/2008 | Grupe | | 726/33 |
| 7,472,175 B2* | 12/2008 | Bartholomew | | 709/219 |
| 7,562,311 B2* | 7/2009 | Schiller | | G06F 17/30274 |
| | | | | 715/769 |
| 7,587,514 B2* | 9/2009 | Anderson | | 709/235 |
| 7,605,846 B2* | 10/2009 | Watanabe | | 348/211.1 |
| 7,684,995 B2* | 3/2010 | McIntyre et al. | | 705/1.1 |
| 7,697,040 B2* | 4/2010 | Sorensen et al. | | 348/231.2 |
| 7,702,821 B2* | 4/2010 | Feinberg et al. | | 710/13 |
| 7,716,200 B2* | 5/2010 | Yasuda | | 707/706 |
| 7,827,498 B2* | 11/2010 | Moore et al. | | 715/760 |
| 7,881,715 B2* | 2/2011 | Kirani et al. | | 455/426.1 |
| 7,965,310 B2* | 6/2011 | Endsley et al. | | 348/14.16 |
| 7,970,240 B1* | 6/2011 | Chao | | G06F 17/30274 |
| | | | | 382/305 |
| 8,046,504 B2* | 10/2011 | Feinberg et al. | | 710/33 |
| 8,073,965 B2* | 12/2011 | Anderson | | 709/235 |
| 8,190,648 B1* | 5/2012 | Tomic | | G06F 17/30286 |
| | | | | 703/10 |
| 8,307,201 B2* | 11/2012 | Wakita et al. | | 713/153 |
| 8,386,458 B2* | 2/2013 | Noguchi | | 707/707 |
| 8,677,132 B1* | 3/2014 | Liao et al. | | 713/176 |
| 2002/0056131 A1* | 5/2002 | Hayashi et al. | | 725/115 |
| 2002/0065741 A1* | 5/2002 | Baum | | 705/26 |
| 2002/0112019 A1* | 8/2002 | Watanabe | | 709/219 |
| 2002/0184318 A1* | 12/2002 | Pineau | | 709/206 |
| 2002/0191081 A1* | 12/2002 | Ueyama | | 348/207.1 |
| 2002/0194470 A1* | 12/2002 | Grupe | | 713/153 |
| 2003/0172059 A1* | 9/2003 | Andrei | | G06F 17/30454 |
| 2003/0212659 A1* | 11/2003 | Ban | | 707/1 |
| 2003/0217063 A1* | 11/2003 | Tomic | | G06F 17/30286 |
| 2003/0231339 A1* | 12/2003 | Makishima et al. | | 358/1.15 |
| 2004/0008226 A1* | 1/2004 | Manolis et al. | | 345/769 |
| 2004/0138569 A1* | 7/2004 | Grunwald et al. | | 600/459 |
| 2004/0153530 A1* | 8/2004 | Machida | | 709/220 |
| 2004/0167971 A1* | 8/2004 | Manolis et al. | | 709/217 |
| 2004/0205169 A1* | 10/2004 | Machida | | 709/220 |
| 2004/0236768 A1* | 11/2004 | Saito | | 707/100 |
| 2004/0250205 A1* | 12/2004 | Conning | | 715/517 |
| 2004/0257921 A1* | 12/2004 | Nishimura | | G06F 1/1616 |
| | | | | 369/30.08 |
| 2005/0062695 A1* | 3/2005 | Cok | | 345/82 |
| 2005/0172218 A1* | 8/2005 | Nishimura et al. | | 715/512 |
| 2005/0177738 A1* | 8/2005 | Van Der Veen et al. | | 713/189 |
| 2005/0182652 A1* | 8/2005 | McIntyre et al. | | 705/1 |
| 2005/0187832 A1* | 8/2005 | Morse et al. | | 705/27 |
| 2005/0200909 A1* | 9/2005 | Kim | | 358/448 |
| 2005/0210395 A1* | 9/2005 | Wakita et al. | | 715/753 |
| 2005/0210413 A1* | 9/2005 | Quek et al. | | 715/838 |
| 2005/0216435 A1* | 9/2005 | Lee | | G06F 17/30274 |
| 2006/0004685 A1* | 1/2006 | Pyhalammi | | G06F 17/30274 |
| 2006/0013197 A1* | 1/2006 | Anderson | | 370/352 |
| 2006/0036949 A1* | 2/2006 | Moore et al. | | 715/730 |
| 2006/0050312 A1* | 3/2006 | Takiyama et al. | | 358/1.15 |
| 2006/0125927 A1* | 6/2006 | Watanabe | | 348/211.1 |
| 2006/0128407 A1* | 6/2006 | Kim | | 455/466 |
| 2006/0139474 A1* | 6/2006 | Endsley et al. | | 348/333.11 |
| 2006/0184540 A1* | 8/2006 | Kung et al. | | 707/10 |
| 2006/0187833 A1* | 8/2006 | Montulli et al. | | 370/230 |
| 2006/0217967 A1* | 9/2006 | Goertzen et al. | | 704/201 |
| 2006/0265398 A1* | 11/2006 | Kaufman | | G06Q 17/24 |
| 2007/0033588 A1* | 2/2007 | Landsman | | 717/178 |
| 2007/0035764 A1* | 2/2007 | Aldrich et al. | | 358/1.15 |
| 2007/0061376 A1* | 3/2007 | Yasuda | | 707/200 |
| 2007/0073937 A1* | 3/2007 | Feinberg et al. | | 710/62 |
| 2007/0094597 A1* | 4/2007 | Rostom | | 715/700 |
| 2007/0097421 A1* | 5/2007 | Sorensen et al. | | 358/1.15 |
| 2007/0106482 A1* | 5/2007 | Zandifar et al. | | 702/85 |
| 2007/0129058 A1* | 6/2007 | Landschaft et al. | | 455/412.1 |
| 2007/0168657 A1* | 7/2007 | Carro | | G06F 21/645 |
| | | | | 713/156 |
| 2007/0186178 A1* | 8/2007 | Schiller | | 715/769 |
| 2007/0192715 A1* | 8/2007 | Kataria | | G06Q 10/06 |
| | | | | 715/764 |
| 2007/0196099 A1* | 8/2007 | Ishiyama et al. | | 396/301 |
| 2007/0222865 A1* | 9/2007 | Levien et al. | | 348/222.1 |
| 2007/0253018 A1* | 11/2007 | Doui | | 358/1.15 |
| 2007/0255965 A1* | 11/2007 | McGucken | | 713/193 |
| 2008/0005460 A1* | 1/2008 | Uemura | | 711/112 |
| 2008/0021926 A1* | 1/2008 | Brock et al. | | 707/104.1 |
| 2008/0060032 A1* | 3/2008 | Toutonghi | | 725/105 |
| 2008/0103913 A1* | 5/2008 | Leach et al. | | 705/26 |
| 2008/0117314 A1* | 5/2008 | Kim et al. | | 348/231.99 |
| 2008/0177994 A1* | 7/2008 | Mayer | | 713/2 |
| 2008/0189659 A1* | 8/2008 | Krutzler | | 715/838 |
| 2008/0215456 A1* | 9/2008 | West et al. | | 705/27 |
| 2008/0222295 A1* | 9/2008 | Robinson et al. | | 709/227 |
| 2008/0298720 A1* | 12/2008 | Klassen et al. | | 382/298 |
| 2009/0240666 A1* | 9/2009 | Noguchi | | 707/3 |
| 2009/0313586 A1* | 12/2009 | Sharma et al. | | 715/853 |
| 2010/0100899 A1* | 4/2010 | Bradbury et al. | | 725/29 |
| 2010/0201845 A1* | 8/2010 | Feinberg et al. | | 348/231.99 |
| 2010/0277597 A1* | 11/2010 | Vaysburg et al. | | 348/207.1 |
| 2010/0280992 A1* | 11/2010 | Vaysburg et al. | | 707/634 |
| 2010/0281424 A1* | 11/2010 | Vaysburg et al. | | 715/810 |
| 2010/0306404 A1* | 12/2010 | Wakita et al. | | 709/231 |
| 2010/0332563 A1* | 12/2010 | Fujikawa | | 707/813 |
| 2011/0004840 A1* | 1/2011 | Feinberg et al. | | 715/772 |
| 2011/0175797 A1* | 7/2011 | Tomisawa et al. | | 345/6 |
| 2011/0252056 A1* | 10/2011 | Cuzacq et al. | | 707/770 |
| 2011/0314208 A1* | 12/2011 | Feinberg et al. | | 711/103 |
| 2012/0044366 A1* | 2/2012 | Anderson | | 348/207.1 |
| 2012/0154863 A1* | 6/2012 | Fuse | | 358/1.15 |
| 2013/0067356 A1* | 3/2013 | Wakita et al. | | 715/753 |
| 2013/0080692 A1* | 3/2013 | Feinberg et al. | | 711/103 |
| 2013/0111336 A1* | 5/2013 | Dorman et al. | | 715/255 |
| 2014/0129627 A1* | 5/2014 | Baldwin et al. | | 709/204 |

FOREIGN PATENT DOCUMENTS

| | | |
|---|---|---|
| JP | 2006-252152 A | 9/2006 |
| JP | 2009514290 T | 4/2009 |
| WO | 2007-048793 A2 | 5/2007 |

* cited by examiner

CONTENT TRANSMISSION DEVICE, CONTENT TRANSMISSION METHOD, AND CONTENT TRANSMISSION PROGRAM

CROSS-REFERENCE TO RELATED APPLICATIONS

The present application claims priority from Japanese Patent Application No. JP2007-182632, filed in the Japanese Patent Office on Jul. 11, 2007, the entire content of which is incorporated herein by reference.

BACKGROUND OF THE INVENTION

Field of the Invention

The present invention relates to a content transmission device, a content transmission method, and a content transmission program, and is suitably applied to, for example, a device that uploads a content to a server on a network.

Description of the Related Art

There has been a personal computer that is connected to a digital camera to transmit (in this case, upload) a content such as an image file stored in the digital camera to a server providing a service on a network by, for example, establishing a web page such as a blog and an uploading site (for example, refer to Jap. Pat. Appln. Publication No. 2006-252152).

There has been a personal computer like the one described above that uses, for example, an uploading application (hereinafter referred to as dedicated uploading application) used exclusively for a specific web page when uploading a content. In such a case, the personal computer starts the dedicated uploading application, displays a graphical user interface (GUI) corresponding to the dedicated uploading application, and allows the user to select a content to be uploaded on the GUI. In this manner, the personal computer uploads the content desired by the user to a server that establishes a corresponding web page.

SUMMARY OF THE INVENTION

However, the dedicated uploading application like the one described above is prepared exclusively for uploading a content to a server for a specific web page. Therefore, the dedicated uploading application is not able to be used when the content is uploaded to a server establishing other web pages. As a result, in case the user uploads the content to a server establishing other web pages, the user has been required to start on a personal computer an application (that is, a web browser) for uploading the content to an optional web page.

Then, with respect to the web browser, the user inputs a universal resource locator (URL) of a web page (hereinafter also referred to as the uploading page) used for uploading a content that is established by a server to which the content is to be uploaded. When an uploading screen based on the uploading page is displayed on the personal computer, the user has been required to search on the uploading screen for, for example, contents that the user desires to upload one by one through hierarchical folders, and paste a path that indicates a location of the content obtained as a result of such searching in a predetermined input section on the uploading screen.

That is, in the conventional personal computer, there has been a problem that the user needs to do a lot of work to select a content to be uploaded when the user uploads the content by using a web browser for uploading the content on an optional web page.

The present invention has been made in view of the above points, and embodies a content transmission device, a content transmission method, and a content transmission program that can transmit a content to an optional transmission destination by simple operation.

According to an aspect of the present invention, there is provided a content transmission device, including: a control section that controls a display section to display a list screen showing a list of contents stored in a storage section and a list of transmission destinations of the contents, controls the display section to display a selected content screen showing one or more of the contents being selected when the control section recognizes that the user operates an operation section to select such one or more of the contents and an optional destination of the transmission destinations from the list screen, and also controls the display section to display an input screen having an input section in which storing location information showing a storing location of the contents in the storage section is input and then controls an application to be started, the application for transmitting the contents corresponding to the storing location information input in the input section to the optional transmission destination being selected; and an acquisition section that acquires the storing location information corresponding to the contents being selected, the storing location information to be input in the input section on the input screen, when the acquisition section recognizes that the user operates the operation section to select the contents from the selected content screen displayed on the display section.

In the above manner, the content transmission device can read out and transmit a corresponding content without requiring the user to search for storing location information of the content to be transmitted and to input the storing location information acquired as a result of the search in an input section on an input screen displayed by an application for transmitting the content to an optional transmission destination, and only by requiring the user to input the acquired storing location information in the input section on the input screen.

According to the present invention, there are provided a control section that controls a display section to display a list screen showing a list of contents stored in a storage section and a list of transmission destinations of the contents, controls the display section to display a selected content screen showing one or more of the contents being selected when the control section recognizes that the user operates an operation section to select such one or more of the contents and an optional destination of the transmission destinations from the list screen, and also controls the display section to display an input screen having an input section in which storing location information showing a storing location of the contents in the storage section is input and then controls an application to be started, the application for transmitting the contents corresponding to the storing location information input in the input section to the optional transmission destination being selected; and an acquisition section that acquires the storing location information corresponding to the contents being selected, the storing location information to be input in the input section on the input screen, when the acquisition section recognizes that the user operates the operation section to select the contents from the selected content screen displayed on the display section. In this manner, a corresponding content can be read out and transmitted without requiring the user to search for the storing location information of the content to be transmitted and to input the storing location information acquired as a result of the search in the input section on the input screen displayed by an application for transmitting the content to an optional transmission destination, and only by requiring the user to input the acquired storing location information in the input section on the input screen. Accordingly, a content transmission device, a content transmission method, and a content transmission program that can transmit a content to an optional transmission destination by simple operation can be realized.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Hereinafter, embodiments of the present invention will be described in detail with reference to the accompanying drawings.

(1) Embodiments

(1-1) Configuration of Image Registration System

Figure 1:
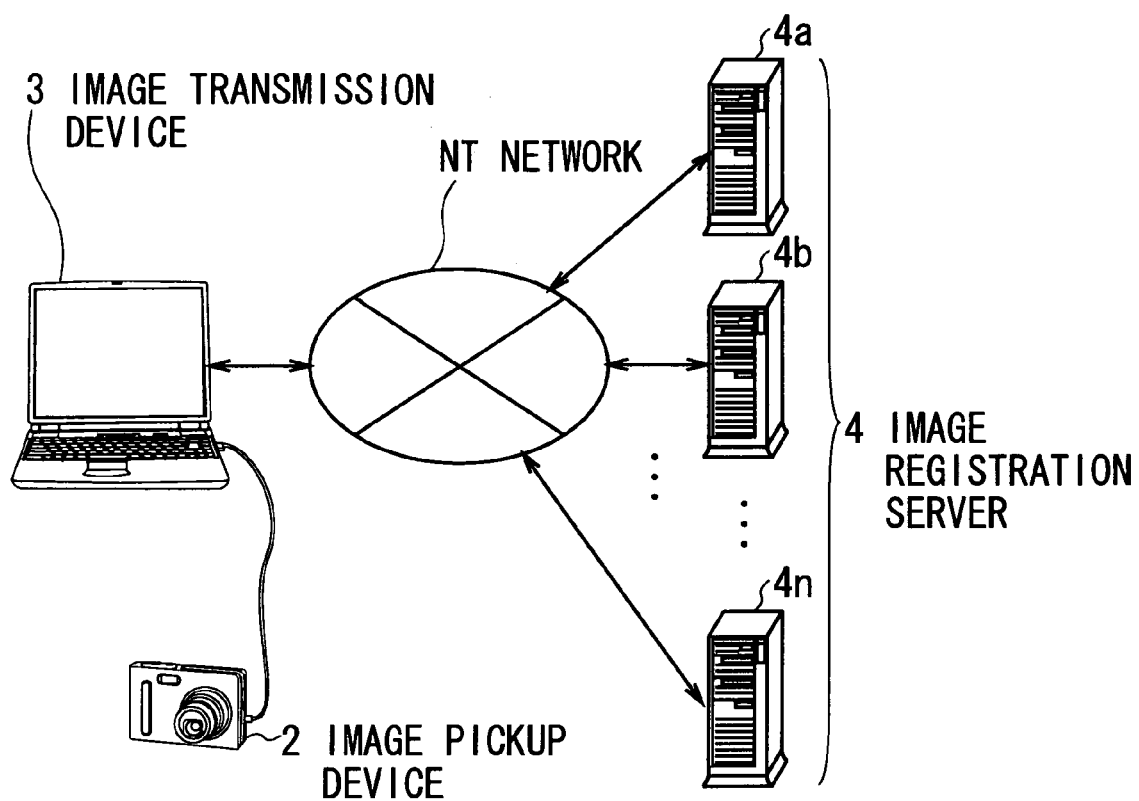
FIG. 1 is a schematic view showing a configuration of an image registration system.

FIG. 1 shows an image registration system 1 according to the present embodiment as an entire figure. The image registration system 1 is configured by an image pickup device 2 having a function of generating an image file by imaging an object and an image transmission device 3 that is connected to the image pickup device 2 and has a function of transmitting (that is, uploading) an image file stored in the image pickup device 2 to optional image registration servers 4 (4a, 4b, . . . , 4n) on a network NT.

Then, each of the image registration servers 4 (4a, 4b, . . . , 4n) registers an image file by storing the image file in a storage section (not shown) when the image file is uploaded from the image transmission device 3.

In the image registration system 1 described above, the image transmission device 3 can upload and register the image file stored in the image pickup device 2 to and in the optional image registration servers 4 (4a, 4b, . . . , 4n).

(1-2) Hardware Configuration of Image Pickup Device

Figure 2:
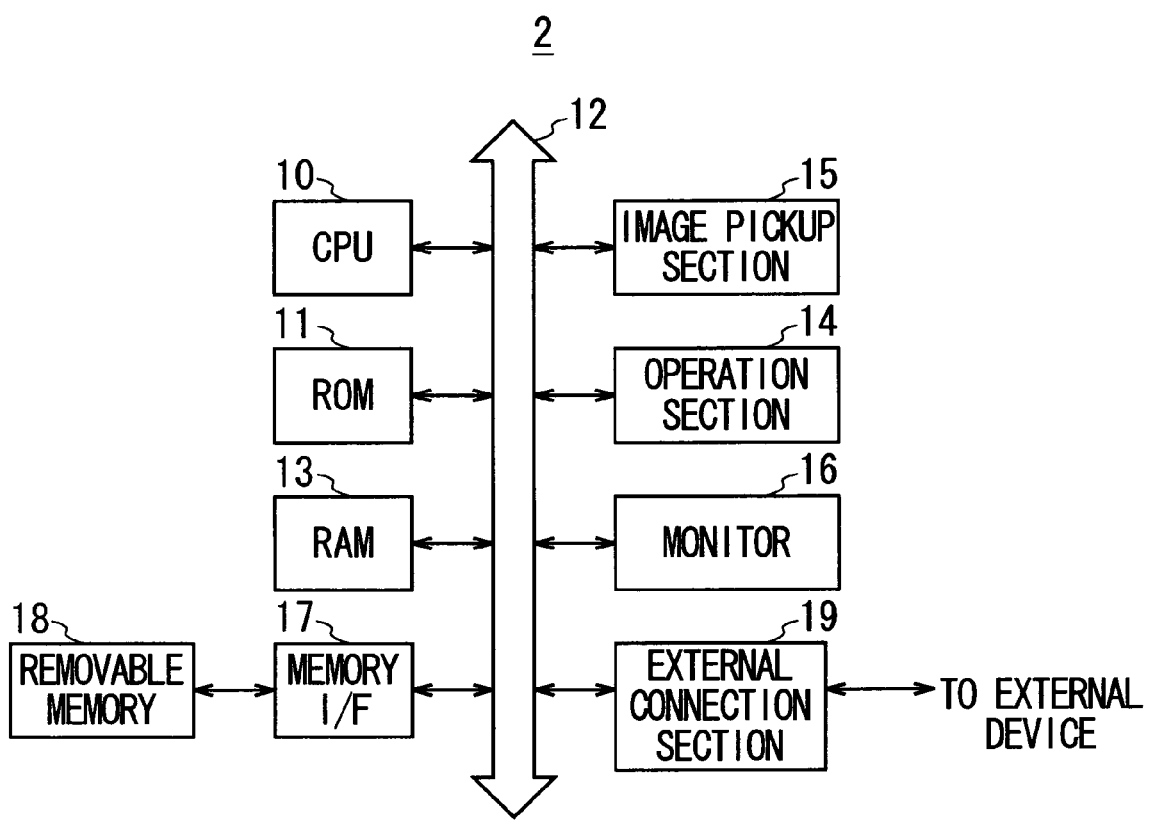
FIG. 2 is a block diagram showing a hardware configuration of an image pickup device.

Next, a hardware configuration of the image pickup device 2 will be described with reference to FIG. 2. In the image pickup device 2, a central processing unit (CPU) 10 reads out a variety of programs such as a basic program and an application program that are stored in a read only memory (ROM) 11 in advance to a random access memory (RAM) 13 through a bus 12. Then, the CPU 10 controls the entire configuration in accordance with the variety of programs expanded on the RAM 13, and also controls each section in accordance with predetermined calculation processing, an image pickup command provided from an operation section 14, and the like.

More specifically, for example, when the user turns on power via the operation section 14, the CPU 10 of the image pickup device 2 images an object by an image pickup section 15 including a lens and an image pickup element to obtain an image signal. Then, the CPU 10 displays an image based on the image signal on a monitor 16 configured with, for example, a liquid crystal display (LCD). In this manner, the image pickup device 2 shows an image of an object imaged by the image pickup section 15 to the user.

When the user provides an instruction to image an object through the operation section 14, the CPU 10 of the image pickup device 2 generates image data by compressing the image signal obtained from the image pickup section 15 at the time the instruction is provided from the user, in accordance with a predetermined compression format (for example, JPEG). Then, the CPU 10 generates an image file including the image data.

The image file is generated in accordance with, for example, an exchangeable image file format (Exif). The image file includes both image data (that is, the main image data) based on the image signal obtained from the image pickup section 15 and thumbnail image data with the number of pixels (for example, 160×120) which is smaller than that of the main image data. In addition, a header of the image file describes image information, such as a name of the image file (for example, a name including a predetermined number such as "DES00001"), date and time of photographing, a model name of the image pickup device 2, compression format identification information showing a compression format (JPEG, in this case) of the main image data and the thumbnail image data, the number of display pixels of the main image data, and storing location information (for example, a path such as "G:\DCIM\NY Travel\DSC02778.JPG", and hereinafter such a path is also referred to as the image path) showing that the image file is stored in what location of a folder hierarchy with what name.

The CPU 10 stores the image file generated in the above manner, for example, in a removable memory 18 connected to a memory interface 17 in a folder structure in accordance with, for example, a Design rule for Camera File system (DCF) standard.

In the above manner, the image pickup device 2 generates an image file by imaging an object, and stores a number of such image files.

In addition, in the removable memory 18 of the image pickup device 2, an image uploading program is stored in advance. The image uploading program is used for displaying a list of image files stored in the image pickup device 2 on a monitor of the image transmission device 3 for uploading when the image pickup device 2 is connected to the image transmission device 3.

When the CPU 10 of the image pickup device 2 recognizes that the image pickup device 2 is connected to the image transmission device 3 through an external connection section 19, the CPU 10 passes entire control of the image pickup device 2 to the image transmission device 3. As a result, when the image pickup device 2 is connected to the image transmission device 3, a stored content (in this case, an image file stored in the DSC standard) in the removable memory 18 can be directly read out and written in by using the image transmission device 3. In this manner, the image pickup device 2 becomes one of mass storages connected to the image transmission device 3.

(1-3) Hardware Configuration of Image Transmission Device

Figure 3:
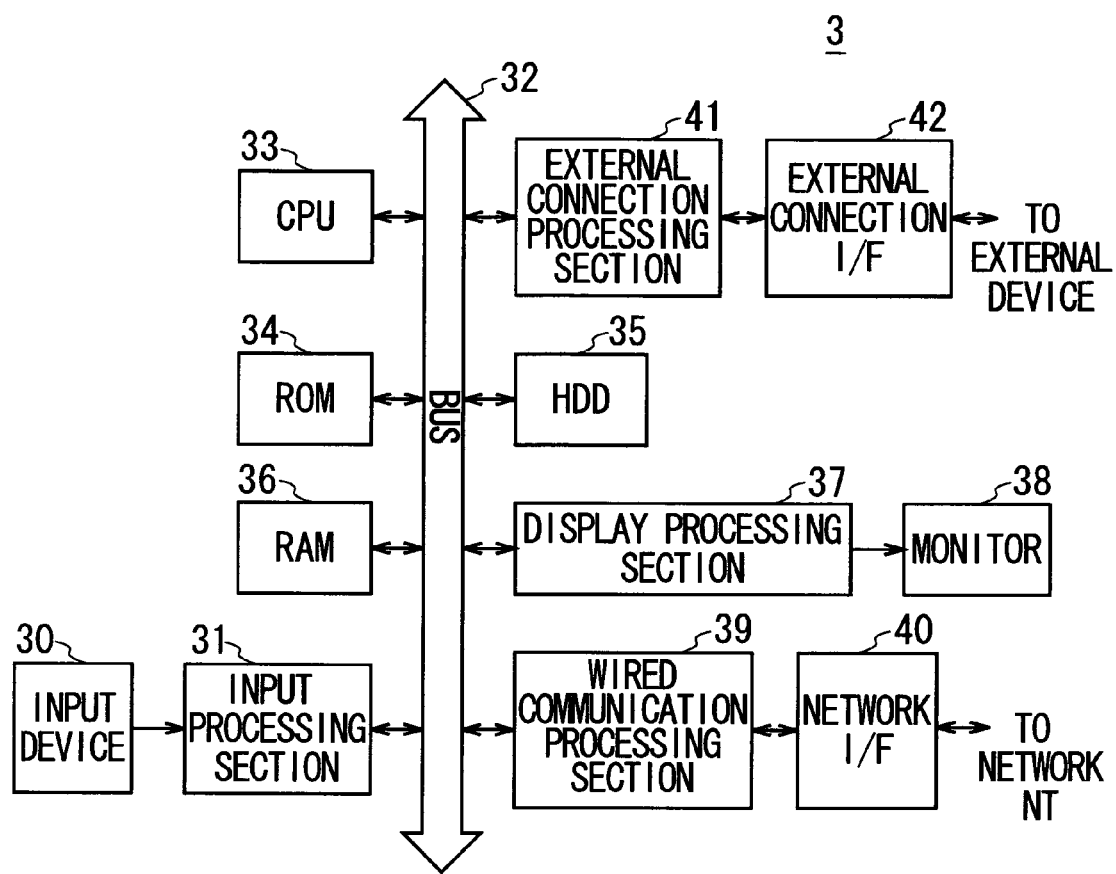
FIG. 3 is a block diagram showing a hardware configuration of the image transmission device.

Next, a hardware configuration of the image transmission device 3 will be described with reference to FIG. 3. When the user operates an input device 30 including a keyboard and a mouse, the input device 30 recognizes such operation, and sends an operation input signal corresponding to such operation to an input processing section 31. The input processing section 31 applies predetermined processing to the supplied operation input signal to convert the operation input signal to an operation command. Then, the input processing section 31 sends the operation command to a CPU 33 via a bus 32.

The CPU 33 reads out on a RAM 36 a variety of programs, such as a basic program and an application program stored in a ROM 34 or a hard disk drive 35 in advance, and an the image uploading program obtained from the image pickup device 2 as described above, via the bus 32. Then, the CPU 33 controls the entire configuration in accordance with the variety of programs expanded on the RAM 36, and also executes a variety of processing in accordance with predetermined calculation processing, an operation command provided from the input processing section 31, and the like.

More specifically, the CPU 33 starts an application (in this case, a web browser) for using an optional web page through operation of the input device 30 by the user in order to establish connection with any of a web pages established on, for example, the image registration servers 4 (4a, 4b, ... 4n). Then, the CPU 33 controls a display processing section 37 to display a browser screen corresponding to start of the web browser on a monitor 38 that is configured with, for example, an LCD.

When an URL for establishing connection with a web page is input in a predetermined input section on the browser screen, the CPU 33 is connected to the web page established by the image registration servers 4 (in this case, any of 4a, 4b, . . . , 4n) sequentially through a wired communication processing section 39, a network interface 40, and the network NT, and obtains web page data of the web page. Then, the CPU 33 displays a web page screen based on the web page data on the monitor 38 by using the display processing section 37.

In the above manner, the image transmission device 3 displays a web page screen corresponding to a web page established on the image registration servers 4 (4a, 4b, . . . , 4n) on the monitor 38 in accordance with an instruction from the user.

When a communication connection is established with an external device (in this case, the image pickup device 2) sequentially through an external connection processing section 41 and an external connection interface 42, the CPU 33 recognizes the removable memory 18 of the image pickup device 2 as one of storage sections of the own device. Then, the CPU 33 automatically reads out and obtains an image uploading program stored in the removable memory 18.

When the CPU 33 obtains the image uploading program, the CPU 33 automatically executes the image uploading program by expanding the program on the RAM 36 to start an image uploading application (hereinafter referred to as the uploading application). Then, as a result of starting the uploading application, the CPU 33 obtains image list screen data used for generating an image list screen showing a list of image files stored in the image pickup device 2.

In addition, the CPU 33 accesses the image pickup device 2, with which communication connection is established, via the external connection processing section 41 and the external connection interface 42. Then, the CPU 33 searches for all image files (in this case, all image files regardless of whether such image files are stored in different hierarchies of a folder structure) stored in the image pickup device 2 in accordance with the DCF standard.

Then, the CPU 33 obtains thumbnail image data for each of the image files obtained as a result of the search. Further, the CPU 33 obtains image information of a header of each of the obtained image files.

As described above, the above image information includes a model name of the image pickup device 2, compression format identification information, the number of display pixels of the main image data, an image path showing that in what location in a folder hierarchy and with what name the image file is stored, and the like.

When the CPU 33 obtains the image list screen data, and the thumbnail image data and the image information of each of the image files stored in the image pickup device 2, the CPU 33 sends these data and information to the display processing section 37 via the bus 32.

Figure 4:
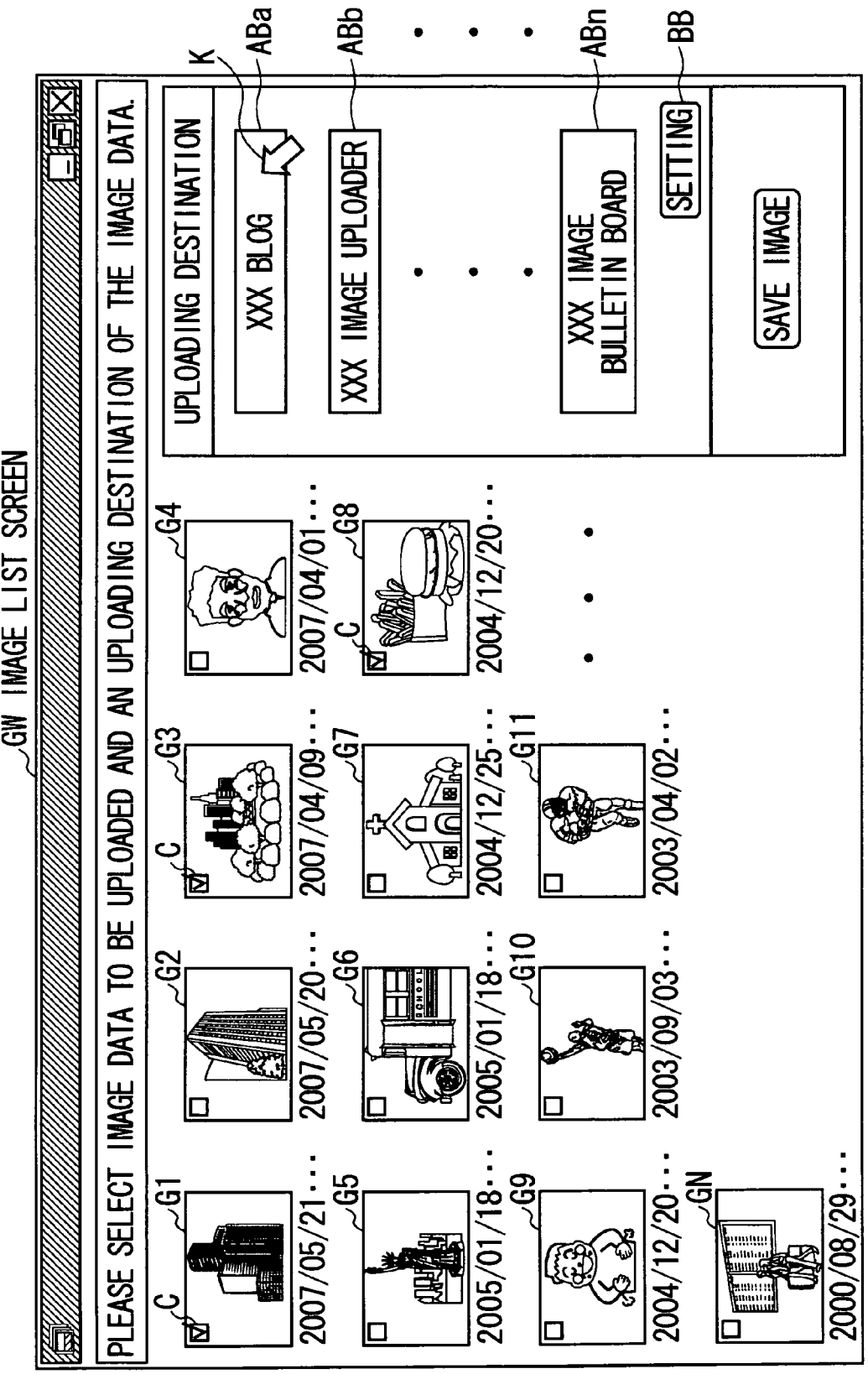
FIG. 4 is a schematic view showing a configuration of an image list screen.

When the display processing section 37 receives the image list screen data, the thumbnail image data, and the image information, the display processing section 37 generates an image list screen GW based on the image list screen data, the thumbnail image data, and the image information, and displays the image list screen GW on the monitor 38, as shown in FIG. 4.

On the image list screen GW, a list of thumbnail images G (G1, G2, . . . , GN) based on the thumbnail image data are allocated.

Each of the thumbnail images G (G1, G2, . . . , GN) is provided with a check box C which can be clicked with a cursor K to select the corresponding thumbnail images G. In addition, on a lower section of each of the thumbnail images G (G1, G2, . . . , GN), photographed date and time specified in the corresponding image information are displayed.

In addition, the image list screen GW is provided with uploading destination buttons AB (ABa, ABb, . . . , ABn) showing uploading destinations to which the image files corresponding to the thumbnail images G(G1, G2, . . . GN) selected by the user are to be uploaded.

Each of the uploading destination buttons AB (ABa, ABb, . . . , ABn) displays a name, such as "xxx Blog", "yyy Image Uploader", "zzz Image Bulletin Board", or the like (hereinafter referred to as the uploading page name) of a web page (for example, an uploading page for uploading an image file in a predetermined site) registered in advance by operation of the user.

The uploading pages are assumed to be established on the optional image registration servers 4 (4a, 4b, . . . , 4n).

In addition, each of the uploading destination buttons AB (ABa, ABb, . . . , ABn) is associated with a URL used for establishing connection with a predetermined uploading page which is registered in advance by operation of the user.

Further, for each of the uploading destination buttons AB (ABa, ABb, . . . , ABn), an upper limit (for example, shown with a size such as "1640×480" and hereinafter referred to as the uploading upper limit size) of the number of display pixels of the main image data of an image file to be uploaded is set in advance by operation of the user.

Moreover, to each of the uploading destination buttons AB (ABa, ABb, . . . , ABn), a web browser starting command for starting a web browser used for uploading a content (in this case, an image file) to an optional web page is allocated.

An uploading page name, the URL, and the uploading upper limit size of each of the uploading destination buttons AB (ABa, ABb, . . . , ABn) are set by operation of the user through the input device 30 on a setting screen (not shown) displayed on the monitor 38 when a setting button BB provided on the image list screen GW is selected. In addition, the uploading upper limit size is set by the user in case, for example, an upper limit is set for the number of display pixels of the main image data included in an image file which can be uploaded to a predetermined uploading page.

In the manner described above, when the image transmission device 3 is connected to the image pickup device 2, the image transmission device 3 generates the image list screen GW that displays image files stored in the image pickup device 2 in a list, and displays the image list screen GW on the monitor 38. In this manner, the image transmission device 3 can show what image files are stored in the image pickup device 2 to the user, by only being connected to the image pickup device 2.

After the CPU 33 of the image transmission device 3 displays the image list screen GW on the monitor 38, in case the user operates the input device 30 to select, for example, the uploading destination button ABa by using the cursor K in a state where the check boxes C of the thumbnail images G (G1, G3, and G8, as an example) have been marked on the image list screen GW by using the cursor K, the CPU 33 acquires a URL of an uploading page associated with the uploading destination button ABa.

Hereinafter, as an example, description will proceed with respect to a case in which a URL of an uploading page of "xxx Blog" established by the image registration server 4a is associated with the uploading destination button ABa.

Figure 5:
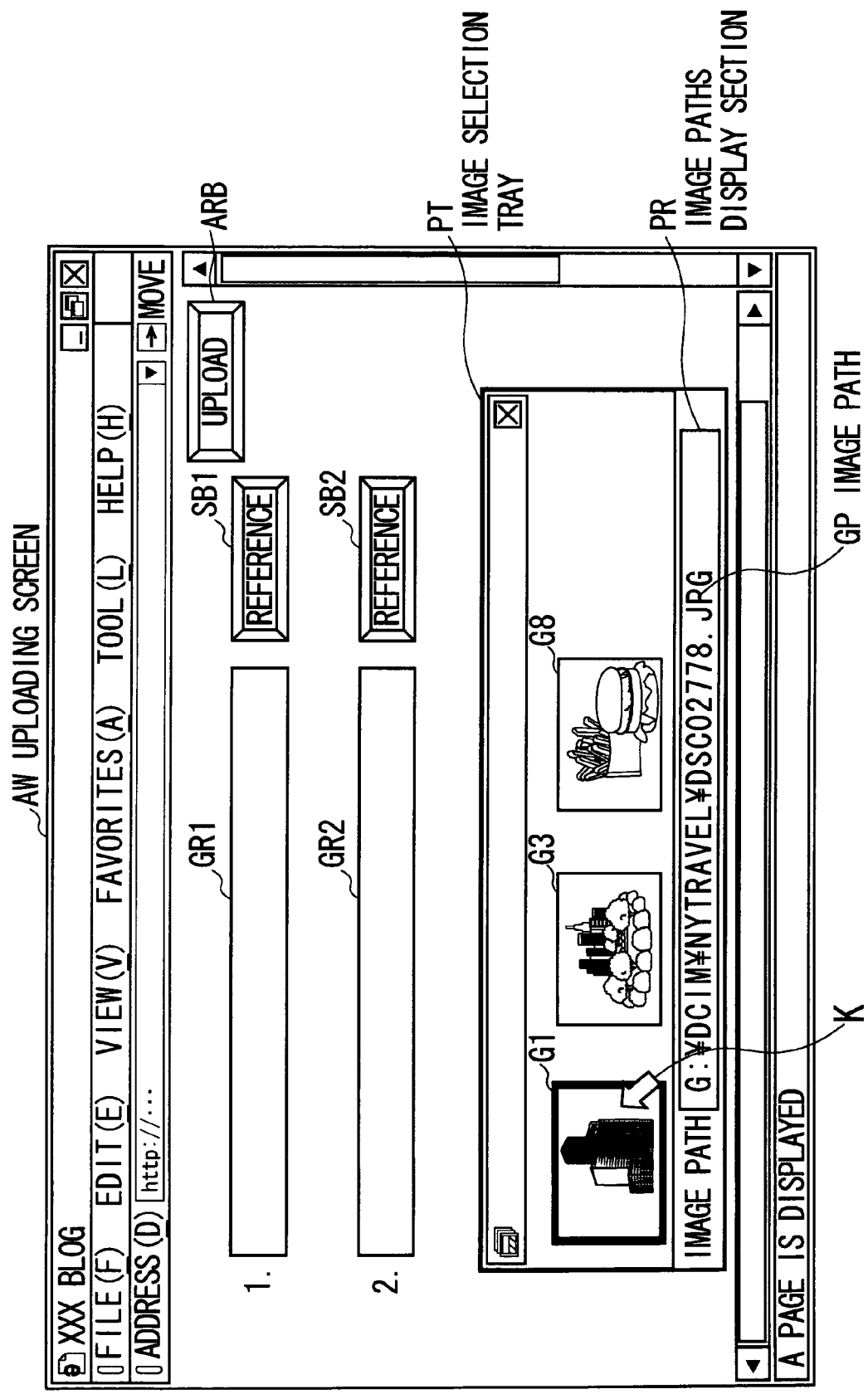
FIG. 5 is a schematic view showing configurations of an uploading screen and an image selection tray.

When the CPU 33 acquires the URL, the CPU 33 starts a web browser in accordance with a web browser starting command set with respect to the uploading destination button ABa on the image list screen GW. In addition, the CPU 33 inputs the acquired URL in a predetermined input section in the started web browser. In this manner, the CPU 33 automatically establishes connection with the uploading page of "xxx Blog" established by the image registration server 4a via the network NT. Then, the CPU 33 acquires page data of the uploading page and sends the page data to the display processing section 37. In this manner, as shown in FIG. 5, the CPU 33 displays an uploading screen AW based on the page data on the monitor 38.

The uploading screen AW is provided with a plurality of reference buttons SB (SB1, SB2, . . . ) used for allowing the user to refer to an image file to be uploaded through a folder hierarchy of the image transmission device 3, a plurality of image path input sections GR (GR1, GR2, . . . ) for pasting an image path of the image file acquired as a result of the user referring to the image file by using the reference buttons SB (SB1, SB2, . . . ), and an uploading execution button ARB that executes uploading of the image file designated by the image path entered in the image path input sections GR to the image registration server 4a. The uploading execution button ARB is associated with a URL indicating an uploading destination (in this case, a storage section (not shown) on the image registration server 4a) of the image file.

In addition, at this time, the CPU 33 acquires tray data for displaying an image selection tray PT that shows all the thumbnail images G (in this case, G1, G3, and G8) having the check boxes C being marked in the image list screen GW from the uploading application, and sends the tray data to the display processing section 37.

The display processing section 37 displays the image selection tray PT based on the tray data on the monitor 38 in a manner superposing the image selection tray PT on the uploading screen AW. That is, the display processing section 37 displays the image selection tray PT in front of the uploading screen AW when the monitor 38 is viewed from the front.

At this time, the CPU 33 displays the image selection tray PT, which is small in size to the extent that the user can see most of the uploading screen AW, on the monitor 38 in a manner superposing the image selection tray PT on the uploading screen AW. In this manner, the CPU 33 can reduce an area of the uploading screen AW hidden by the image selection tray PT as much as possible.

When the CPU 33 displays the image selection tray PT on the monitor 38, the CPU 33 acquires the number of display pixels of the main image data corresponding to each of the thumbnail images G (G1, G3, and G8) having the check boxes C being marked in the image list screen GW from image information corresponding to each of the thumbnail images G (G1, G3, and G8). Then, the CPU 33 sequentially compares the numbers of display pixels and an uploading upper limit size (in this case, 640×480 as an example) set for the uploading destination button ABa. Then, the CPU 33 carries out processing in accordance with a result of such comparison.

More specifically, the CPU 33 compares the number of display pixels of the main image data corresponding to the thumbnail image G (in this case, the thumbnail image G1 as an example) and the uploading upper limit size. As a result, in case the number of display pixels of the main image data corresponding to the thumbnail image G1 is smaller than the uploading upper limit size, the CPU 33 allocates the image G1 in the image selection tray PT as it is.

On the other hand, the CPU 33 compares the number of display pixels of the main image data corresponding to the thumbnail image G (in this case, the thumbnail image G3 as an example) and the uploading upper limit size. As a result, in case the number of display pixels of the main image data corresponding to the thumbnail image G3 is larger than the uploading upper limit size, the CPU 33 acquires an image file (that is, an image file corresponding to the thumbnail image G3) specified in accordance with an image path contained in the image information corresponding to the thumbnail image G3 from the image pickup device 2.

When the CPU 33 acquires the image file corresponding to the thumbnail image G3 from the image pickup device 2, the CPU 33 generates reduced image data by reducing the number of display pixels of the main image data of the image file to "640×480" which is the uploading upper limit size. Then, the CPU 33 adds the image information of the original image file to the generated reduced image data, and temporarily stores the reduced image data in the hard disk drive 35 as a reduced image file. In this case, an image path in the image information is changed according to the change of storing location.

Then, the CPU 33 allocates the thumbnail image G3 in the image selection tray PT, and also associates the reduced image file temporarily stored in the hard disk drive 35 with the thumbnail image G3.

In the above manner, the CPU 33 allocates the thumbnail images G (in this case, G1, G3, and G8) having the check boxes C being marked in the image list screen GW in the image selection tray PT.

The CPU 33 allocates, in accordance with selection of the user, image files and reduced image files stored in different hierarchies in a folder structure of the image transmission device 3, such as an image file stored in the removable memory 18 of the image pickup device 2 and a reduced image file stored in the hard disk drive 35 of the image transmission device 3, all at once regardless of in which hierarchies in the folder structure such image files and reduced image files are stored. As a result, when the image files and reduced image files stored in the different hierarchies in the folder structure are uploaded all at once, the image transmission device 3 does not have to ask the user to carry out complicated operation, that is to select the image files and the reduced image files to be uploaded while moving through hierarchies of the folder structure.

In the above manner, when the uploading destination button ABa is selected in a state where the thumbnail images G (in this case, G1, G3, and G8) are selected by operation of the user in the image list screen GW, the image transmission device 3 displays the uploading screen AW acquired from an uploading page on the network NT in accordance with a URL associated with the uploading destination button ABa on the monitor 38, and also displays the image selection tray PT allocated with the thumbnail images G1, G3, and G8 selected in the image list screen GW for uploading on the monitor 38 in a manner superposing the image selection tray PT on the uploading screen AW.

After the uploading screen AW and the image selection tray PT are displayed on the monitor 38 (FIG. 5), when the user operates the input device 30 to select, for example, the thumbnail image G1 with a cursor K from the thumbnail images G (in this case, G1, G3, and G8) in the image selection tray PT, the CPU 33 of the image transmission device 3 acquires an image path GP, such as "G:\DCIM\NY Travel\DSC02778.JPG", from image information of an image file associated with the thumbnail image G1, and temporarily stores the image path GP in the RAM 36.

At this time, the CPU 33 displays the image path GP corresponding to the thumbnail image G (in this case, G1) selected with the cursor K in an image path display section PR in the image selection tray PT. In this manner, when the user selects the thumbnail image G and the CPU 33 acquires the image path GP corresponding to the thumbnail image G, the CPU 33 displays the image path GP in the image path display section PR so as to be able to notify to the user that the image path GP is acquired and of a content of the image path GP all at once.

Figure 6:
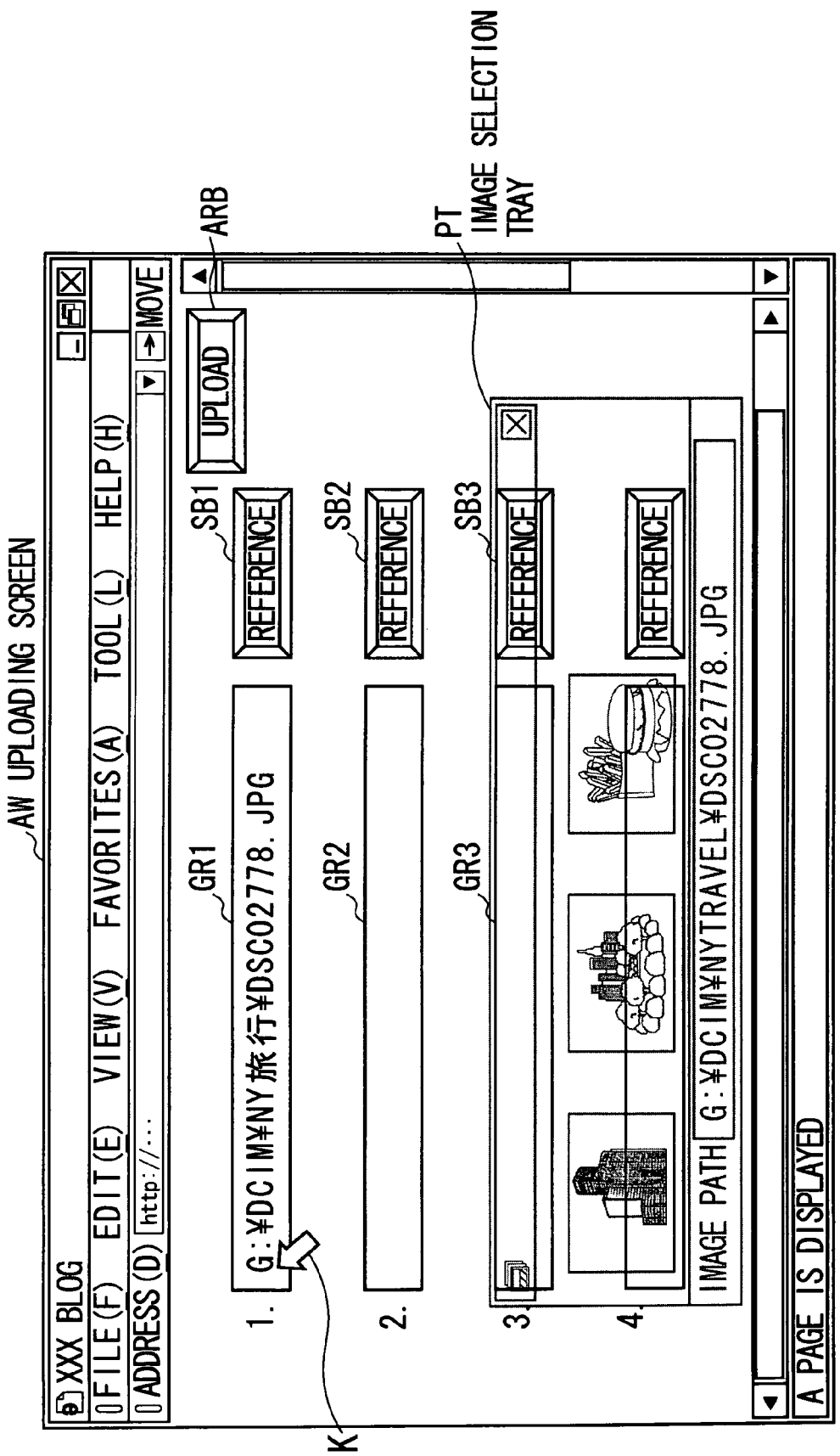
FIG. 6 is a schematic view used for explaining a state of pasting an image path.

In a state where the image path GP is stored in the RAM 36 in the above manner, when the user operates the input device 30 to select an image path input section GR1 in the uploading screen AW with the cursor K and instruct to copy the image path GP (that is, to paste the image path GP corresponding to the thumbnail image G1) to the image path input section GR, the CPU 33 reads out the image path GP "G:\DCIM\NY Travel\DSC02778.JPG" from the RAM 36 and pastes the image path GP in the image path input section GR1, as shown in FIG. 6. As a result, the CPU 33 can have the image path GP input in the image path input section GR1, without requiring the user to carry out operation to refer to an image file to be uploaded through hierarchies of a folder structure from a reference button SB (in this case, SB1) in the uploading screen AW, and to paste the image path GP of an image file selected as a result of such reference in the image path input section GR1.

In a similar manner, with respect to the thumbnail image G3 in the image selection tray PT as well, when the user operates the input device 30 to select the thumbnail image G3 with the cursor K, the CPU 33 acquires the image path GP (in this case, "C:\Documents and Settings\TAROU\Temp\DSC02776A.JPG") of image information of a reduced image file associated with the thumbnail image G3. When the user selects the image path input section GR2 in the uploading screen AW with the cursor K to instruct pasting, the CPU 33 pastes the image path GP in the image path input section GR2.

In a similar manner, with respect to the image path GP of the thumbnail image G8 in the image selection tray PT as well, the CPU 33 pastes the image path GP in an image path input section GR3 in the uploading screen AW in accordance with user's operation via the input device 30.

As described above, the CPU 33 does not require the user to carry out operation to refer to image files (in this case, image files and reduced image files corresponding to the thumbnail images G1, G3, and G8) to be uploaded one by one through hierarchies of a folder structure from each of reference buttons SB (in this case, SB1, SB2, and SB3), and to sequentially paste the image path GP of the image file selected as a result of such reference in the image path input sections GR (in this case, GR1, GR2, and GR3). Instead, the CPU 33 requires the user only to repeat operation to acquire the image paths GP of image files and reduced image files corresponding to the thumbnail images G1, G3, and G8 in the image selection tray PT and paste the image paths GP in the image path input sections GR1, GR2, and GR3 in the uploading screen AW. In this manner, the CPU 33 can have the image paths GP input in the image path input sections GR (in this case, GR1, GR2, and GR3) in the uploading screen AW.

At this time, the CPU 33 continues to display the image selection tray PT in front of the uploading screen AW, even while processing is carried out on the uploading screen AW by user's operation (FIG. 6). In this manner, the CPU 33 can avoid a situation where the image selection tray PT moves to the back of the uploading screen AW and is hidden by the uploading screen AW from the user. As a result, the user can easily carry out operation to pass the image path GP between the image selection tray PT and the uploading screen AW.

In addition, the CPU 33 displays the image selection tray PT which is located in front of the uploading screen AW in a translucent manner, while processing is carried out on the uploading screen AW by user's operation (FIG. 6). In this manner, while the CPU 33 continues to display the image selection tray PT in front of the uploading screen AW, the CPU 33 can show the entire uploading screen AW trough the translucent image selection tray PT while processing is carried out on the uploading screen AW. As a result, the CPU 33 can facilitate user's operation to pass the image path GP between the image selection tray PT and the uploading screen AW, and also can show an entire display content of the uploading screen AW when the user's operation is carried out on the uploading screen AW.

Figure 7:
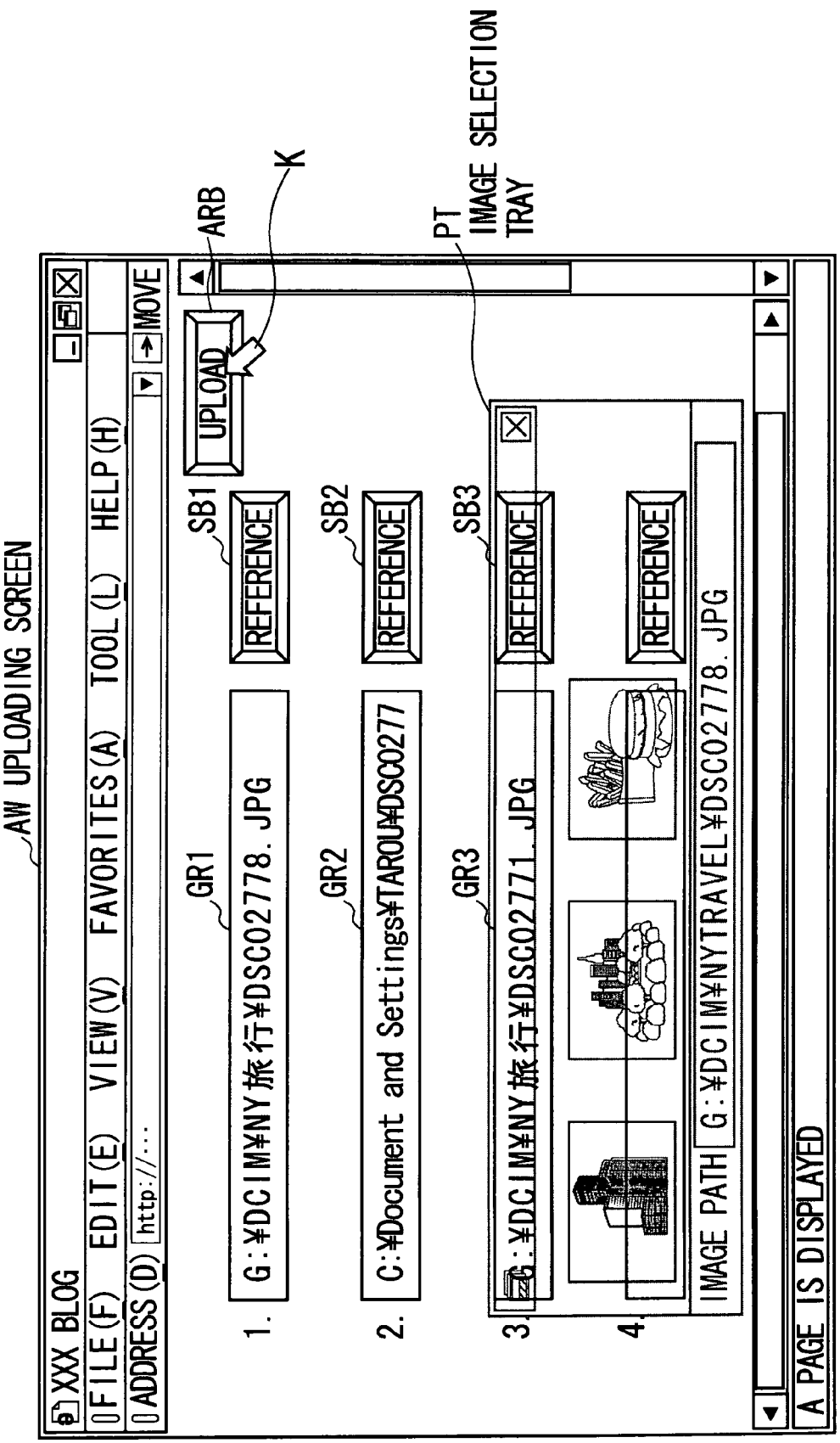
FIG. 7 is a schematic view used for explaining a state of executing uploading.

As shown in FIG. 7, when the user operates the input device 30 to select an uploading execution button ARB on the uploading screen AW with the cursor K in a state where image paths are pasted in the image path input sections GR1, GR2, and GR3 on the uploading screen AW, the CPU 33 acquires image files and reduced image files respectively designated by the image paths GR entered in the image path input sections GR (in this case, GR1, GR2, and GR3) on the uploading screen AW by processing of a web browser.

More specifically, when the uploading execution button ARB on the uploading screen AW is selected by the user, the CPU 33 reads out an image file designated by the image path GP "G:\DCIM\NY Travel\DSC02778.JPG" entered in the image path input section GR1 on the uploading screen AW from the removable memory 18 of the image pickup device 2. In addition, the CPU 33 reads out a reduced image file designated by the image path GP "C:\Documents and Settings\TAROU\Temp\DSC02776A.JPG" entered in the image path input section GR2 on the uploading screen AW from the hard disk drive 35. Further, the CPU 33 reads out an image file designated by the image path GP "G:\DCIM\NY Travel\DSC02771.JPG" entered in the image path input section GR3 on the uploading screen AW from the removable memory 18 of the image pickup device 2.

Then, the CPU 33 sends (that is, uploads) the image files and the reduced image file to an uploading destination (in this case, a storage section (now shown) of the image registration server 4a) shown by a URL associated with the uploading execution button ARB.

In the above manner, in accordance with operation of the user, the image transmission device 3 acquires the image paths GP associated with the thumbnail images G (in this case, G1, G3, and G8) in the image selection tray PT for pasting in the image path input sections GR on the uploading screen AW acquired from the web browser.

As described above, the image transmission device 3 does not require the user to carry out work to refer to image files and reduced image files to be uploaded one by one through folder hierarchies from each of the reference buttons SB (SB1, SB2, and SB3) on the uploading screen AW to acquire the image paths GP thereof, and paste such image paths GP in the image path input sections GR (GR1, GR2, and GR3) sequentially. Instead, the image transmission device 3 requires the user only to carry out simple operation to paste the image paths GP acquired by selecting the thumbnail images G in the image selection tray PT in the image path input section GR on the uploading screen AW. In this manner, the image transmission device 3 can upload image files or reduced image files designated by the image paths GP.

The CPU 33 erases the reduced image file which is generated and temporarily stored in the hard disk drive 35 when the image selection tray PT is displayed on the monitor 38 at a predetermined timing after a series of uploading processing is terminated. In this manner, the CPU 33 can automatically erase the reduced image file without requiring the user to carry out operation to erase the reduced image file generated only for uploading of the image file. As a result, the CPU 33 can avoid a situation where an unnecessary file is left in the image transmission device 3.

(1-4) Image Uploading Processing Steps

Here, in the image registration system 1 described above, detailed description will be made with respect to processing steps (hereinafter referred to as the image uploading processing steps) for the image transmission device 3 to upload image files stored in the image pickup device 2 to the image registration servers 4 (4a, 4b, . . . , 4n) through the network NT, with reference to flowcharts shown in FIGS. 8 and 9. The image uploading processing steps are processing in which the CPU 33 of the image transmission device 3 uses a web browser for uploading an image file to an existing and optional uploading destination by executing an image uploading program stored in the image pickup device 2 when the CPU 33 is connected to the image pickup device 2.

Figure 8:
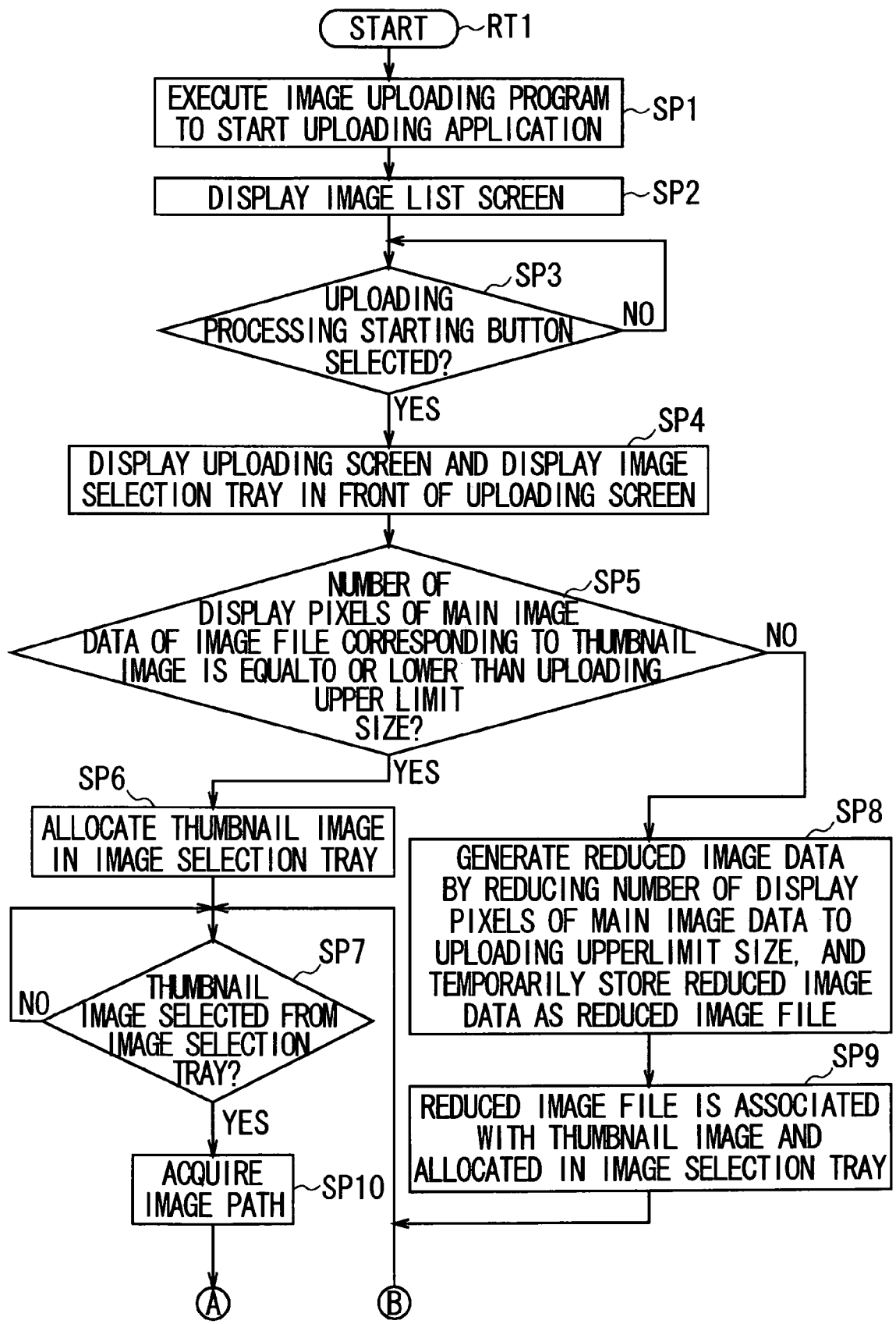
FIG. 8 is a flowchart (1) showing steps of image uploading processing.

When the CPU 33 of the image transmission device 3 is connected to the image pickup device 2 and acquires the image uploading program stored in the image pickup device 2, the CPU 33 starts an image uploading processing step RT1 and moves to Step SP1 (FIG. 8). In Step SP1, the CPU 33 executes the image uploading program to start the uploading application, and moves to next Step SP2.

In step SP2, the CPU 33 of the image transmission device 3 acquires image list screen data in accordance with start of the uploading application, and also obtains thumbnail image data and image information for all image files stored in the image pickup device 2. Then, the CPU 33 displays the image list screen GW based on the image list screen data, the thumbnail image data and the image information on the monitor 38, and moves to next Step SP3.

In step SP3, the CPU 33 of the image transmission device 3 determines whether any of the uploading destination buttons AB (ABa, ABb, . . . , ABn) on the image list screen GW is selected by the user or not.

If the CPU 33 obtains a positive result in Step SP3, this means that any of the uploading destination buttons AB (ABa, ABb, . . . , ABn) on the image list screen GW is selected in a state where one or a plurality of the thumbnail images G (G1, G2, . . . , GN) on the image list screen GW is or are selected by the user. Accordingly, in this case, the CPU 33 of the image transmission device 3 moves to next Step SP4.

On the other hand, if the CPU 33 obtains a negative result in Step SP3, this means that selection of the thumbnail images G (G1, G2, . . . , GN) on the image list screen GW by the user has not been completed yet. Therefore, the CPU 33 of the image transmission device 3 repeats the processing of Step SP3.

In step SP4, the CPU 33 of the image transmission device 3 starts a web browser in accordance with a web browser starting command set for the uploading destination button ABa selected on the image list screen GW, and also establishes connection with an uploading page on the network NT by inputting a URL associated with the uploading destination button AB in the web browser. Then, the CPU 33 acquires page data from the uploading page, and displays the uploading screen AW based on the page data on the monitor 38.

In addition, the CPU 33 displays the image selection tray PT that allocates the thumbnail images G (in this case, G1, G3, and G8) selected by the user on the image list screen GW for uploading on the monitor 38 in such a manner as superposing the image selection tray PT on the uploading screen AW (that is, placing the image selection tray PT in front of the uploading screen AW at all times), and moves to next Step SP5.

In step SP5, the CPU 33 of the image transmission device 3 determines whether each of the numbers of display pixels (that is, the numbers of display pixels of the main image data of the image files) of image information of the image files corresponding to the thumbnail images G (G1, G3, and G8) selected on the image list screen GW is equal to or lower than the uploading upper limit size set for the uploading destination button AB selected on the uploading screen AW.

If the CPU 33 of the image transmission device 3 obtains a positive result in Step SP5, the CPU 33 moves to next Step SP6.

In Step SP6, the CPU 33 of the image transmission device 3 allocates the thumbnail images G (in this case, G1 and G8) corresponding to image files having the number of display pixels equal to or lower than the uploading upper limit size, among the thumbnail images G (G1, G3, and G8) selected on the uploading screen AW, in the image selection tray PT, and moves to next Step SP7.

On the other hand, in case the CPU 33 of the image transmission device 3 obtains a negative result in Step SP5, the CPU 33 moves to Step SP8.

In Step SP8, the CPU 33 of the image transmission device 3 reads out from the image pickup device 2 an image file having the number of display pixels higher than the uploading upper limit size, among image files corresponding to the thumbnail images G (G1, G3, and G8) selected on the uploading screen AW.

In addition, the CPU 33 generates reduced image data by reducing the number of display pixel of the main image data of the readout image file to the uploading upper limit size. Then, the CPU 33 temporarily stores the reduced image data in the hard disk drive 35 as a reduced image file, and moves to next Step SP9.

In Step SP9, the CPU 33 of the image transmission device 3 allocates the thumbnail image G (in this case, G3) corresponding to the image file having the number of display pixels exceeding the uploading upper limit size, among the thumbnail images G (G1, G3, and G8) selected on the uploading screen AW, in the display selection tray PT, and also associates the reduced image file temporarily stored in the hard disk drive 35 with the thumbnail image G3. Then, the CPU 33 of the image transmission device 3 moves to Step SP7.

In Step SP7, the CPU 33 of the image transmission device 3 determines whether any of the thumbnail images G (in this case, G1, G3, and G8) in the image selection tray PT is selected by the user or not.

If the CPU 33 obtains a positive result in this Step SP7, this means that the user requests acquisition of the image path GP corresponding to the selected thumbnail image G. Accordingly, in this case, the CPU 33 of the image transmission device 3 moves to Step SP10.

Figure 9:
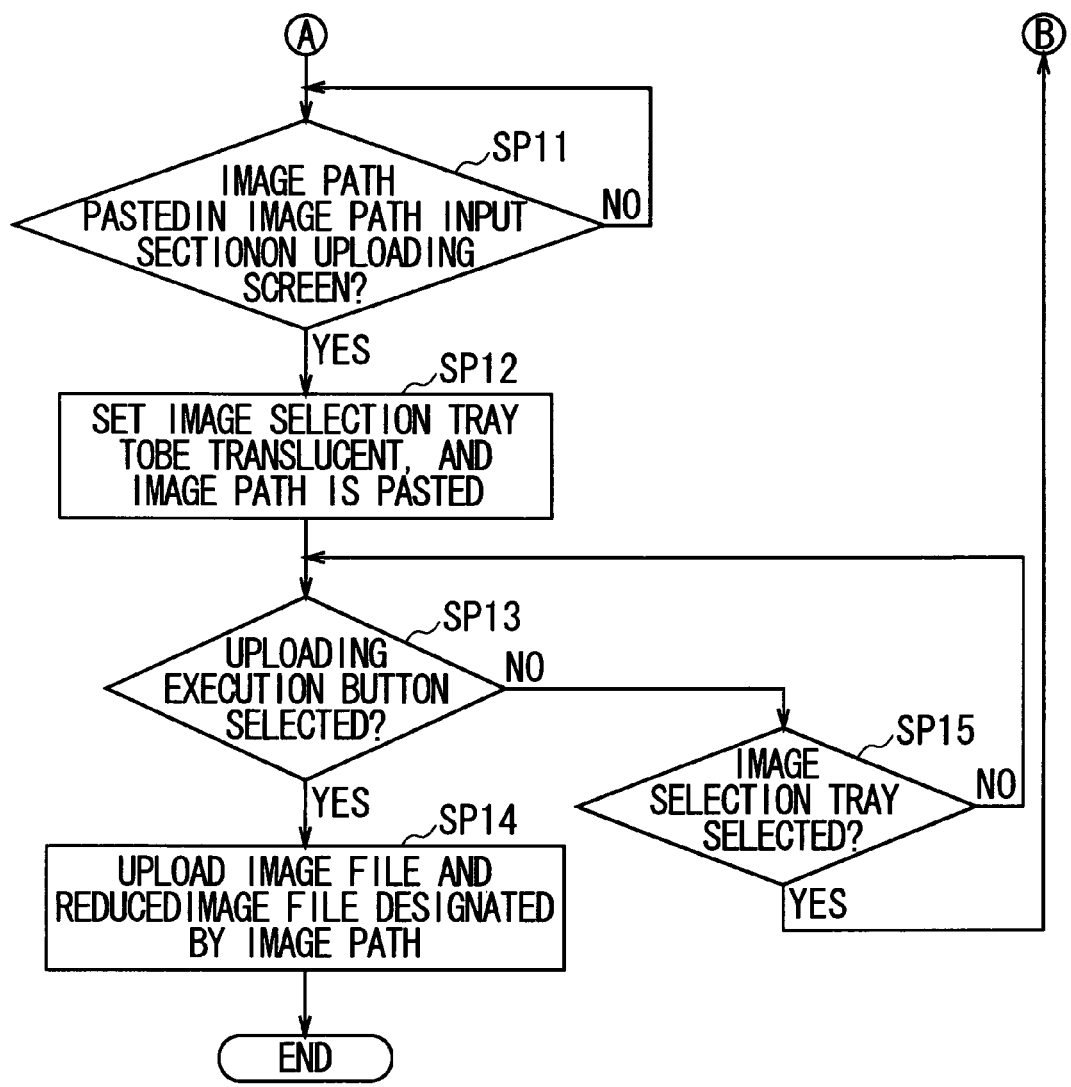
FIG. 9 is a flowchart (2) showing steps of the image uploading processing.

In Step SP10, the CPU 33 of the image transmission device 3 acquires the image path GP for an image file corresponding to the selected thumbnail image G, or the image path GP for a reduced image file corresponding to the selected thumbnail image G, and then moves to next Step SP11 (FIG. 9).

On the other hand, if the CPU 33 obtains a negative result in Step SP7, this means that selection of the thumbnail images G (G1, G3, . . . GN) in the image selection tray PT by the user has not been completed yet. Therefore, in this case, the CPU 33 of the image transmission device 3 repeats the processing of Step SP7.

In Step SP11 (FIG. 9), the CPU 33 of the image transmission device 3 determines whether any of the image path input sections GR (GR1, GR2, . . . ) on the uploading screen AW is selected and the image path GP is instructed to be pasted in the image path input sections GR by user's operation.

If the CPU 33 of the image transmission device 3 obtains a positive result in this Step SP11, the CPU 33 moves to next Step SP12, sets the image selection tray PT to be translucent, and pastes the image path GP in the selected image path input section GR. Then, the CPU 33 moves to next Step SP13.

On the other hand, if the CPU 33 obtains a negative result in this Step SP11, this means that pasting of the image paths GP in the image path input sections GR on the uploading screen AW by the user has not been completed yet. Therefore, in this case, the CPU 33 of the image transmission device 3 repeats the processing of Step SP11.

In Step SP13, the CPU 33 of the image transmission device 3 determines whether the uploading execution button ARB on the uploading screen AW is selected or not.

If the CPU 33 obtains a positive result in this Step SP13, this means that the user requests uploading of image files. Accordingly, in this case, the CPU 33 of the image transmission device 3 moves to next Step SP14, reads out image files and reduced image files designated by the image paths GP pasted (that is, entered) in the image path input sections GR on the uploading screen AW, and uploads such image files to the image registration server 4 (in this case, any of 4a, 4b, . . . , 4n). Then, the CPU 33 ends the image uploading processing steps RT1.

On the other hand, in case the CPU 33 of the image transmission device 3 obtains a negative result in Step SP13, the CPU 33 moves to Step SP15.

In Step SP15, the CPU 33 of the image transmission device 3 determines whether the image selection tray PT is selected by user's operation.

If the CPU 33 obtains a negative result in this Step SP15, this merely means that the uploading execution button ARB on the uploading screen AW has not been selected by the user yet. Accordingly, in this case, the CPU 33 of the image transmission device 3 returns to Step SP13.

On the other hand, when the CPU 33 obtains a positive result in Step SP15, this means that there is left, in the image selection tray PT, the thumbnail image G with respect to which the image path GP is not pasted to the image path input section GR on the uploading screen AW. Therefore, the CPU 33 of the image transmission device 3 returns a state of the image selection tray PT from the translucent state to the original state (that is, a non-translucent state where the underneath uploading screen AW is not shown through the image selection tray PT) and returns to Step SP7. Then, until the CPU 33 obtains a positive result in Step SP13, the CPU 33 repeats the processing from Steps SP7 to SP15 described above.

In accordance with the image uploading processing steps RT1 described above, in the image registration system 1, the CPU 33 of the image transmission device 3 uploads image files and reduced image files stored in the image pickup device 2.

(1-5) Operation and Advantageous Effect

In the above configuration, when the image transmission device 3 of the image registration system 1 is connected to the image pickup device 2 that stores an image file as a result of image pickup, the image transmission device 3 displays the image list screen GW showing a list of the thumbnail images G (G1, G2, . . . , GN) corresponding to the image files stored in the image pickup device 2, and the uploading destination buttons AB (ABa, ABb, . . . , ABn) used for starting processing of uploading the image files for each of uploading destinations (in this case, the image registration servers 4a, 4b, ..., 4n) of the image files.

In addition, when the user selects the uploading destination button AB (in this case, ABa) after selecting the thumbnail images G (in this case, G1, G3, and G8) from a list of the thumbnail images G (G1, G2, ..., GN) shown in the image list screen GW, the image transmission device 3 starts a web browser for uploading the image files to an optional uploading destination in order to acquire page data from the uploading destination (in this case, the image registration server 4a). Then, the image transmission device 3 displays the uploading screen AW based on the page data and the image selection tray PT used for selecting image files corresponding to the selected thumbnail images G1, G3, and G8 all at once.

Further, when the thumbnail images G (G1, G3, and G8) are selected in the image selection tray PT by user's operation, the image transmission device 3 acquires the image paths GP corresponding to the thumbnail images G (G1, G3, and G8). Further, when the user inputs operation to paste the image paths GP in the image path input sections GR (GR1, GR2, ...) in the uploading screen AW, the image transmission device 3 pastes the image paths GP in the image path input sections GR (GR1, GR2, ...).

Then, when the user selects the uploading execution button ARB on the uploading screen AW, the image transmission device 3 reads out image files designated by the image paths GP in the image path input sections GR (GR1, GR2, ...), and uploads the image files to an uploading destination through the network NT.

In the above manner, the image transmission device 3 does not require the user to carry out work to refer to the image paths GP of image files to be uploaded one by one through folder hierarchies of the image transmission device 3 from the reference buttons SB on the uploading screen AW acquired from a web browser, and to paste the image paths GP acquired as a result of such reference in the image path input sections GR on the uploading screen AW. Instead, the image transmission device 3 only requires the user to paste the image paths GP obtained by selecting the thumbnail images G (G1, G3, and G8) in the image selection tray PT. In this manner, the image transmission device 3 can have the selected image files read out and uploaded. As a result, the user can upload image files with simple operation by using a web browser that uploads the image files to an optional uploading destination.

In addition, when the image transmission device 3 displays the image selection tray PT on the monitor 38, the image transmission device 3 compares the number of display pixels of the main image data of the image files corresponding to the thumbnail images G allocated in the image selection tray PT and the uploading upper limit size. In case the number of display pixels of the main image data of the image file corresponding to the thumbnail image G is larger than the uploading upper limit size, the image transmission device 3 generates reduced image data by reducing the number of display pixels of the main image data of the image file corresponding to the thumbnail image G to the uploading upper limit size.

Then, the image transmission device 3 temporarily stores the reduced image data in the hard disk drive 35 as a reduced image file, and also associates the reduced image data with the thumbnail image G corresponding to the original image file.

In the above manner, when an image file is uploaded to an uploading page that designates an upper limit for the number of display pixels of the main image data of an image file which can be uploaded, the image transmission device 3 can upload the image file (in this case, a reduced image file) without requiring the user to carry out complicated work, such as checking whether (the main image data of) the image file has the number of display pixels that allows the image to be uploaded or not and, in case the image file is not able to be uploaded, generating reduced image data by reducing the main image data of the image file so that the image file can be uploaded. Accordingly, usability can be improved by omitting work of the user.

According to the above configuration, the image list screen GW showing a list of image files stored in the image pickup device 2 and a list of uploading destinations to which the image files are uploaded is displayed on the monitor 38. When the user operates the input device 30 to select one or more image files and an uploading destination from the image list screen GW, the image selection tray PT showing the one or more image files selected by the user is displayed on the monitor 38, and also the uploading screen AW having the image path input section GR in which the image path GP showing a storing location of the image file in the storage section is entered is displayed on the monitor 38. Then, a web browser that uploads an image file corresponding to the image path GP entered in the image path input section GR to a selected optional uploading destination is started and the uploading screen AW is displayed on the monitor 38. In this state, when the user operates the input device 30 to select an image file from the image selection tray PT, the image path GP of the selected image file is acquired. In this manner, the selected image file can be read out and uploaded only by requiring the user to paste the image path GP acquired by selecting an image file in the image selection tray PT in the image path input section GR on the uploading screen AW, without requiring the user to carry out work, such as referring to the image paths GP of image files to be uploaded one by one through folder hierarchies of the image transmission device 3 and pasting the image paths GP acquired as a result of such referring in the image path input sections GR on the uploading screen AW displayed by a web browser that uploads the image files to the optional uploading destination. Accordingly, the user can upload the image files with simple operation by using the web browser that uploads the image files to the optional uploading destination.

(1-6) Other Embodiments

In the embodiment described above, the description was made with respect to a case where image files are stored in the removable memory 18 of the image pickup device 2 and, when the image transmission device 3 is connected to the image pickup device 2, the image transmission device 3 displays the image files in the removable memory 18 in a list. However, the present invention is not limited thereto, and the image files may be stored in the RAM 13 of the image pickup device 2. Alternatively, the image files may be transferred to and stored in the hard disk drive 35 of the image transmission device 3 when the image transmission device 3 is connected to the image pickup device 2. That is, a storing location of the image files may be any location, and as long as an image uploading program corresponding to such a storing location is prepared in advance, an advantageous effect similar to that of the embodiment described above can be achieved. In addition, by changing setting of the image uploading program (in this case, the uploading application as a result of starting the image uploading program) in accordance with user's operation with respect to the image transmission device 3, the image uploading program may change the storing location of the corresponding image files. Similarly, a storing location of the image uploading program may be any location, and setting thereof may be changed in accordance with user's operation with respect to the image transmission device 3.

Figure 10:
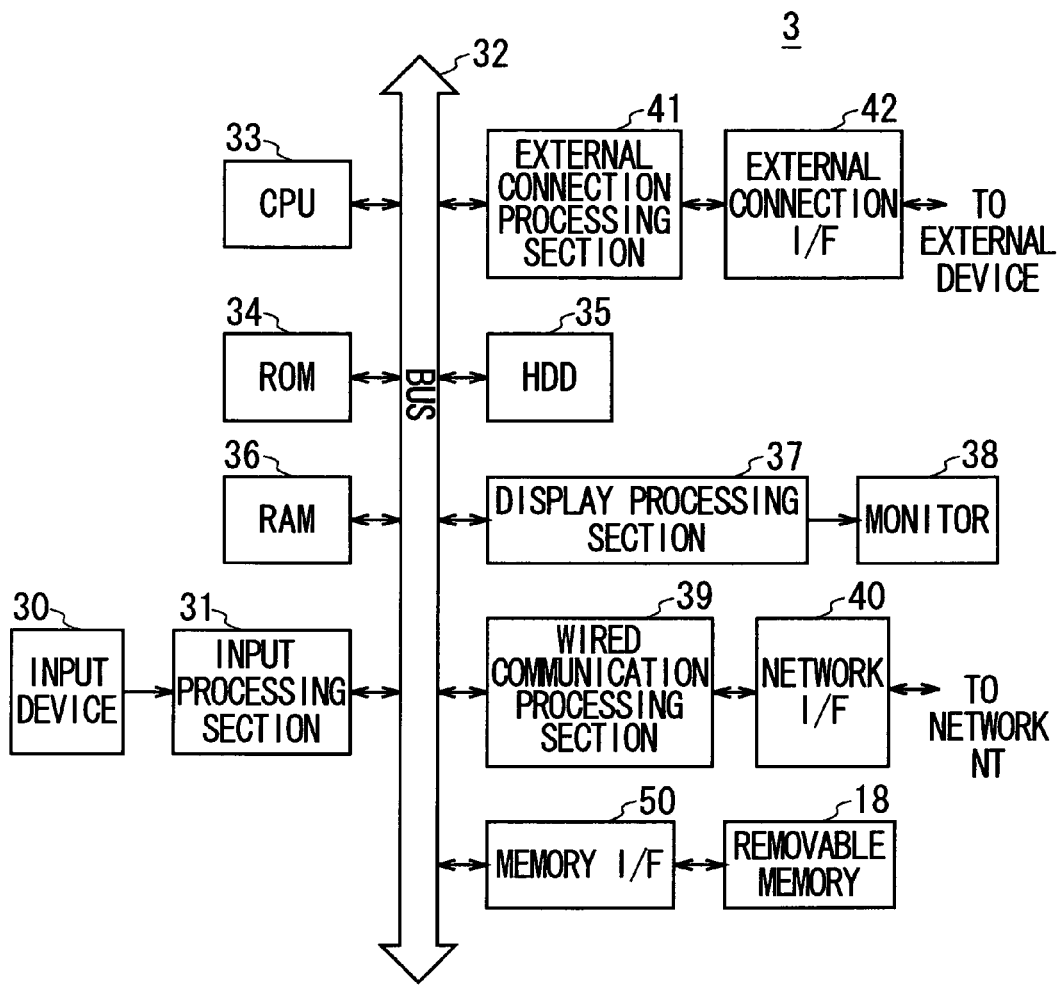
FIG. 10 is a block diagram showing a hardware configuration of an image transmission device according to another embodiment.

In addition, in the above case, as shown in FIG. 10, the image transmission device 3 may be configured with a memory interface 50, and the image transmission device 3 may carry out processing similar to the embodiment described above when the removable memory 18 is dismounted from the image pickup device 2 and connected to the memory interface 50. In this case, an advantageous effect similar to the embodiment described above can be achieved when the image pickup device 2 stores the image uploading program in the removable memory 18 in advance.

Figure 11:
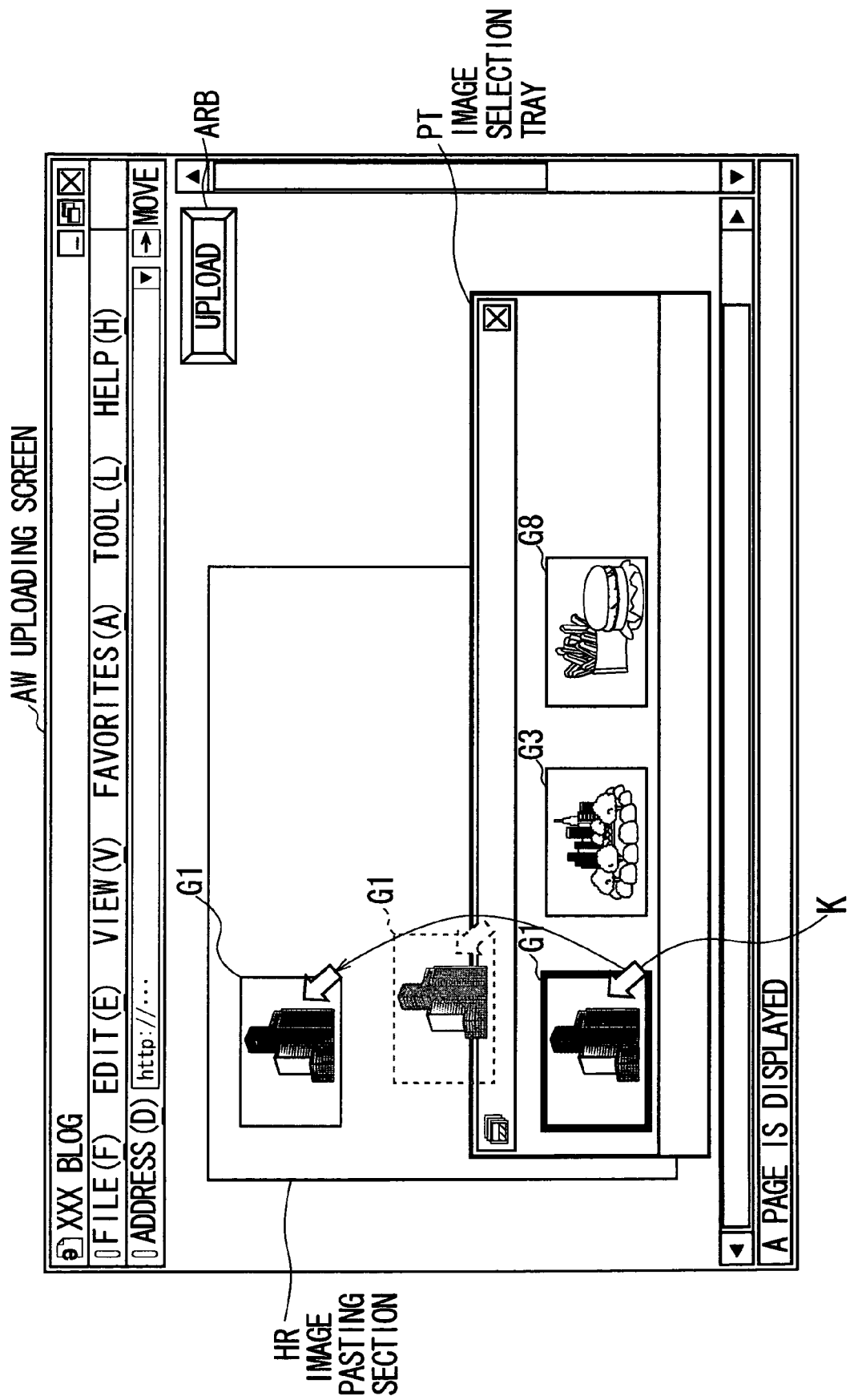
FIG. 11 is a schematic view showing configurations of the uploading screen and the image selection tray according to the another embodiment.

In addition, in the embodiment described above, the description was made with respect to a case where the image transmission device 3 pastes the image paths GP acquired from the image selection tray PT in the image path input sections GR on the uploading screen AW by user's operation. However, the present invention is not limited thereto, and as shown in FIG. 11, for example, with respect to the uploading screen AW having an image pasting section HR to which images are clicked and dropped, the thumbnail images G (in this case, G1, G3, and G8) in the image selection tray PT may be clicked, and dropped after being moved to the image pasting section HR on the uploading screen AW in accordance with user's operation.

In this case, the image transmission device 3 inputs to the uploading screen AW the image path GP corresponding to the thumbnail image G (in this case, G1 as an example) pasted in the image pasting section HR on the uploading screen AW, and as a result, an advantageous effect similar to that of the embodiment described above can be achieved.

Further, in the above case, the image transmission device 3 may have a plurality of the thumbnail images G allocated in the image selection tray PT clicked and dropped in the image pasting section HR on the uploading screen AW at once by user's operation. In this manner, the image transmission device 3 can allow the user to enter a plurality of the image paths GP corresponding to a plurality of the thumbnail images G in the image selection tray PT on the uploading screen AW at once without requiring the user to paste the plurality of the image paths GP one by one by moving between the image selection tray PT and the uploading screen AW for a number of times. In this manner, usability can be improved.

Further, in the embodiment described above, the description was made with respect to the case where the image transmission device 3 uploads image files (image data) stored in the image pickup device 2 that is connected to the image transmission device 3 to the image registration servers 4 in accordance with the uploading application. However, the present invention is not limited thereto, and files to be uploaded may be of other contents, such as movie files (movie data), music files (music data), and text files (text data). Also, such contents may be stored in other variety of external devices, such as a movie reproducing and recording device and a portable type music reproducing device.

Further, in the embodiment described above, the description was made with respect to the case where the image pickup device 2 images an object and generates image data, and after that, the image pickup device 2 generates image files including the image data (in this case, the main image data) in accordance with an Exif standard and stores the image files. However, the present invention is not limited thereto, and the generated image data may be stored as it is.

In such a case, an advantageous effect similar to that of the embodiment described above can be achieved if the image transmission device 3 obtains thumbnail images G allocated in the image list screen GW and the image selection tray PT by reducing image data stored in the image pickup device 2.

Further, in the embodiment described above, the description was made with respect to the case where, when the image transmission device 3 generates reduced image data, the image transmission device 3 temporarily stores the reduced image data as a reduced image file in the hard disk drive 35, and associates the reduced image file with the thumbnail image G corresponding to the original image file in the image selection tray PT. However, the present invention is not limited thereto, and a reduced image based on the generated reduced image data may be allocated in the image selection tray PT in place of the thumbnail image G corresponding to the original image file. In this case, an advantageous effect similar to that of the embodiment described above can be achieved if the image transmission device 3 is configured to acquire the image path GP (in this case, for example, a temporary path temporarily stored in the RAM 36) of reduced image data corresponding to the reduced image data when a reduced image in the image selection tray PT is selected by user's operation.

Further, in the embodiment described above, the description was made with respect to a case where the image transmission device 3 uploads an image file and a reduced image file from the uploading screen AW obtained by starting a web browser as an application that transmits image files to an optional uploading destination. However, the present invention is not limited thereto, and a mailer that sends and receives mails and an existing folder display application that displays a content of the image transmission device 3 and a content of a folder of other devices on the network NT, for example, Internet Explorer, may be started as the application that transmits image files to an optional uploading destination.

In the above manner, for example, in case a mailer is started, the image transmission device 3 only requires the user to carry out operation to click the thumbnail images G in the image selection tray PT and drop the thumbnail image G in a mail screen based on the mailer. In this manner, an image file and a reduced image file designated by the image path GP corresponding to the thumbnail image G can be attached to a mail.

In addition, in case an existing folder display application is started and a folder to be displayed first by the folder display program is designated by a path in advance, the image transmission device 3 only requires the user to carry out operation to click the thumbnail image G in the image selection tray PT and drop the thumbnail image G in an optional folder in the image transmission device 3 or an optional folder in other devices on the network NT. In this manner, image files and reduced image files designated by the image paths GP corresponding to the thumbnail images G can be transferred to a desired folder.

Further, in the embodiment described above, the description was made with respect to the case where image files (contents) are uploaded to an uploading page indicated by a URL. However, the present invention is not limited thereto, and an internet protocol (IP) address, a mail address, and the like may be used in place of a URL. In this manner, an advantageous effect similar to that of the embodiment described above can be achieved in case the image transmission device 3 transmits a content to other devices on the network NT (internet and intranet) indicated by an IP address or to other devices indicated by a mail address.

Further, in the embodiment described above, the description was made with respect to the case where the image transmission device 3 displays the image selection tray PT on the monitor 38 in a manner that the image selection tray PT is displayed in front of the uploading screen AW. However, the present invention is not limited thereto, and the image uploading program may be set so that the uploading screen AW and the image selection tray PT do not superpose on each other in a display area of the monitor 38.

Further, in the embodiment described above, the description was made with respect to the case where the image transmission device 3 compares the number of display pixels as an information amount of the main image data of an image file corresponding to the thumbnail image G allocated in the image selection tray PT and the uploading upper limit size, and in case the number of display pixels is larger than the uploading upper limit size, the image transmission device 3 reduces the number of display pixels of the main image data to the uploading upper limit size to generate reduced image data. However, the present invention is not limited thereto, and such comparison processing may be not carried out in case the uploading upper limit size is not input in advance.

In addition, in the above case, an upper limit of a data size as an information amount of an image file may be designated as the uploading upper limit size, and the image transmission device 3 may compare data size of image files corresponding to the thumbnail images G allocated in the image selection tray PT and the uploading upper limit size. Then, in case the data size of the image files is larger than the uploading upper limit size, the image transmission device 3 may generate reduced image data by reducing a data size of the main image data to the uploading upper limit size. In such a case as well, an advantageous effect similar to that of the embodiment described above can be achieved.

Further, in the above case, an upper limit of color information (black and white, 16 colors, 256 colors, . . . ) as an information amount of an image file may be designated as the uploading upper limit size, and the image transmission device 3 may compare the color information of the main image data of image files corresponding to the thumbnail images G allocated in the image selection tray PT and the uploading upper limit size. Then, in case the color information of the image files is larger than the uploading upper limit size, the image transmission device 3 may generate reduced image data by reducing the color information of the main image data to the uploading upper limit size. In such a case as well, an advantageous effect similar to that of the embodiment described above can be obtained.

Further, in the above case, compression format identification information designating a compression format of image files may be set in advance, and the image transmission device 3 may compare a compression format of the main image data of image files corresponding to the thumbnail images G allocated in the image selection tray PT and the compression format identification information. Then, as a result of the above comparison, in case the compression format of the main image data of the image files and the compression format identification information are different, the image transmission device 3 may convert the main image data of the image files to have the compression format indicated by the compression format identification information. In the above manner, when a compression format for image files which can be uploaded is designated on the uploading page, the user sets the compression format identification information corresponding to the compression format in advance. Accordingly, the image transmission device 3 can upload the image files without requiring the user to check whether the image files have a compression format that allows the image files to be uploaded, and change the compression format (that is, in case the compression format of the main image data of the image files and the compression format identification information are different, the image files having the compression format converted automatically are uploaded). Thus, work of the user can be reduced.

Further, in the embodiment described above, the description was made with respect to the case where the image transmission device 3 temporarily stores a reduced image file in the hard disk drive 35 after adding image information of the original image file to reduced image data. However, the present invention is not limited thereto, it suffices that only a storage location of the reduced image file temporarily stored in the hard disk drive 35 is known, and at least the image path GP is added to the reduced image data. More specifically, when the image transmission device 3 temporarily stores the reduced image data in the hard disk drive 35 as the reduced image file, a header of the reduced image file may include the image path GP.

Further, in the embodiment described above, the description was made with respect to the case where a web browser has a function of uploading a content (in this case, an image file). However, the present invention is not limited thereto, and the web browser may have other functions, such as a function of browsing a web page and a function of uploading a content, as long as the web browser includes the function of uploading the content (in this case, an image file).

Further, in the embodiment described above, the description was made with respect to the case where the image transmission device 3 allocates a URL set by the user in advance and the uploading destination buttons AB (ABa, ABb, . . . , ABn) corresponding to uploading names in the uploading screen AW. However, the present invention is not limited thereto, and the image transmission device 3 may read out URLs of bookmarks registered in an existing browser and bookmark names, and allocate the uploading destination buttons AB corresponding thereto in the uploading screen AW. In this manner, the image transmission device 3 can omit work of the user to input setting of the uploading destination buttons. Accordingly, the usability can be improved.

Further, in the embodiment described above, the description was made with respect to the case where, when the uploading destination buttons AB (ABa, ABb, . . . , ABn) on the image list screen GT are selected, the image transmission device 3 establishes connection with the uploading page of "xxx Blog" by a URL associated with the uploading destination buttons AB (ABa, ABb, . . . , ABn), and displays the uploading screen AW. However, the present invention is not limited thereto, and, depending on URLs associated with the uploading destination buttons AB (ABa, ABb, . . . , ABn), for example, the image transmission device 3 may establish connection with a top page and a log-in page of the "xxx Blog", and display a screen corresponding to the top page and the log-in page. That is, when image files are uploaded, the image transmission device 3 only displays a web page of URLs that the user sets for the uploading destination buttons AB (ABa, ABb, . . . , ABn), and the user can freely change setting with respect to destinations of connection by such URLs.

Further, in the embodiment described above, the description was made with respect to the case where the image transmission device 3 later erases the reduced image data temporarily stored in the hard disk drive 35. However, the present invention is not limited thereto, and the reduced image file may remain to be stored in the hard disk drive 35 as it is. Alternatively, a location for temporary storage may be other storage locations, such as the RAM 36.

Further, in the embodiment described above, the description was made with respect to the case where, when the user selects any of the uploading destination buttons AB (ABa, ABb, . . . , ABn) in a state where the user selects the thumbnail images G, the image transmission device 3 displays the uploading screen AW and the image selection tray PT on the monitor 38. However, the present invention is not limited thereto, and, in case the user selects one thumbnail image G in the image list screen GW, the image transmission device 3 may acquire the image path GP of the thumbnail image G when the user selects any of the uploading destination buttons AB (ABa, ABb, . . . , ABn), and display only the uploading screen AW on the monitor 38 without displaying the image selection tray PT. In this manner, the image transmission device 3 can upload an image file corresponding to the desired thumbnail image G only by requiring the user to enter the acquired image path GP in the image path input section GR in the uploading screen AW. Accordingly, the image file can be more easily uploaded since selection of the thumbnail image G in the image selection tray PT is not carried out. The above is similarly applied to a reduced image file.

Further, in the embodiment described above, the description was made with respect to the case where the present invention is applied to the image transmission device 3 including the monitor 38. However, the present invention is not limited thereto, and the present invention may be applied to an image transmission device that does not include the monitor 38 and is externally connected to an external monitor through a predetermined cable or the like. More specifically, a variety of devices, such as a personal computer, an audio component, a hard disk recorder, and a home video game device, that handle other variety of contents can be applied to the image transmission device 3.

Further, the present invention is not limited to the embodiment described above and the other embodiments which have been described so far. An application range of the present invention extends to a mode in which part or whole of the embodiment and the other embodiments which have been described so far are combined optionally, or a mode in which part of these embodiments is extracted.

The present invention can be used for a device that uploads a content to a server on a network.

It should be understood by those skilled in the art that various modifications, combinations, sub-combinations and alterations may occur depending on design requirements and other factors insofar as they are within the scope of the appended claims or the equivalents thereof.

What is claimed is:

1. A device, comprising: a central processing unit (CPU) to receive a program from a memory device and upon execution of said program to operate as
    (i) a control section controlling a display section to display a list section showing a list of contents stored in a storage section, a selected content section showing one or more of the contents being selected in response to an operation to an operation section to select the one or more of the contents directly from the list section and a content location input section, and controlling a transmission process to be started, the transmission process for transmitting the contents selected to a transmission destination;
    (ii) an acquisition section acquiring storing location information corresponding to the contents being selected from the list section by the operation with respect to the operation section, when the acquisition section recognizes that a user operates the operation section to select the contents from the selected content section displayed on the display section;
    (iii) a comparing section comparing, for each of the contents selected from the list section by the operation of the user with respect to the operation section, an amount of the content and a transmission information amount set in advance; and
    (iv) a reducing section reducing the amount of the content selected from the list section by the operation of the user with respect to the operation section to the transmission information amount to generate a reduced content and to form a reduced image path, in case the amount of the content is larger than the transmission information amount as a result of the comparing,
    wherein during the operation with respect to the operation section, the control section (i) automatically causes the storing location information to be displayed as an image path or the reduced image path in response to the content selection operation input to the operation section by the user, and (ii) automatically causes said image path or the reduced image path to be copied to the content location input section in response to image path selection and paste operation inputs to the operation section by the user without requiring the user to carry out an operation to refer to an image file to be uploaded through hierarchies of a folder structure.

2. The device according to claim 1, in which during the operation with respect to the operation section, the control section controls the display section to display the content location input section showing the list of contents stored in the storage section regardless of a storage hierarchy associated with each content so as to permit the list of contents to include a first content having a first storage hierarchy and a second content having a second storage hierarchy which is different from the first storage hierarchy.

3. A method, comprising:
    a control step of controlling a display section to display a selected content section showing one or more of contents being selected in response to an operation to an operation section to select the one or more of the contents directly from a list section showing a list of contents stored in a storage section and which is displayed on the display section, and a content location input section, and controlling a transmission process to be started, the transmission process for transmitting the contents selected to a transmission destination; and
    an acquisition step of acquiring storing location information corresponding to the contents being selected from the list section by the operation with respect to the operation section, when recognizing that a user operates the operation section to select the contents from the selected content section displayed on the display section;
    comparing, for each of the contents selected from the list section by the operation of the user with respect to the operation section, an amount of the content and a transmission information amount set in advance; and
    reducing the amount of the content selected from the list section by the operation of the user with respect to the operation section to the transmission information amount to generate a reduced content and to form a reduced image path, in case the amount of the content is larger than the transmission information amount as the result of the comparing, wherein the control step includes (i) automatically causing the storing location information to be displayed as an image path or the reduced image path in response to the selection operation input to the operation section by the user, and (ii) automatically causing said image path or the reduced image path to be copied to the content location input section in response to image path selection and paste operation inputs to the operation section by the user without requiring the user to carry out an operation to refer to an image file to be uploaded through hierarchies of a folder structure.

4. The method according to claim 3, further comprising: controlling the display section to display the selected content section having a display area which is smaller than the content location input section that is displayed on the display section when the transmission process is started.

5. The method according to claim 3, further comprising: controlling the display section to display the selected content section in a manner superposing when the transmission process is started, so that the selected content section is displayed in front all the time.

6. The method according to claim 5, further comprising: controlling the selected content section to be translucent while the user operates the operation section to carry out predetermined processing when the transmission process is started.

7. The method according to claim 3, further comprising: searching for the contents stored in the storage section, and controlling the display section to display the list section showing all of the contents obtained as a result of the search.

8. The method according to claim 3, wherein the storing location information corresponding to the contents being selected to be input by the user is displayed on the display section when the acquisition recognizes that the user operates the operation section to select the contents from the selected content section displayed on the display section.

9. The method according to claim 3, wherein, when the storing location information corresponding to the contents being selected to be input by the user is input, the selected content section is set to be translucent.

10. The method according to claim 3, wherein the control step includes controlling a search for each of the contents and acquiring thumbnail image data for the each of the contents.

11. The method according to claim 3, wherein the contents includes image data indicating at least one of type of camera, compression format, and image size in exchangeable image file format (Exif).

12. The method according to claim 3, wherein the control step includes controlling the display section to display a plurality of upload buttons.

13. The method according to claim 3, wherein the one or more of the contents from the list section is selectable by the user using a check box.

14. The method according to claim 3, wherein data corresponding to the contents are allocated at once regardless of the storage hierarchy in which the data are stored.

15. The method of claim 3, wherein the transmission process is stored in a removable memory.

16. The method of claim 3, wherein the transmission process is by a web browser.

17. The method of claim 3, wherein the control step includes controlling comparing of compression format.

18. A non-transitory recording medium recorded with a computer-readable program executable by a computer, the program comprising:

a control step of controlling a display section to display a selected content section showing one or more of contents being selected in response to an operation to an operation section to select the one or more of the contents directly from a list section showing a list of contents stored in a storage section and which is displayed on the display section, and a content location input section, and controlling a transmission process to be started, the transmission process for transmitting the contents selected to the transmission destination;

an acquisition step of acquiring storing location information corresponding to the contents being selected from the list section by the operation with respect to the operation section, when recognizing that a user operates the operation section to select the contents from the selected content section displayed on the display section;

comparing, for each of the contents selected from the list section by the operation of the user with respect to the operation section, an amount of the content and a transmission information amount set in advance; and reducing the amount of the content selected from the list section by the operation of the user with respect to the operation section to the transmission information amount to generate a reduced content and to form a reduced image path, in case the amount of the content is larger than the transmission information amount as the result of the comparing, wherein the control step includes (i) automatically causing the storing location information to be displayed as an image path or the reduced image path in response to the selection operation input to the operation section by the user, and (ii) automatically cause said image path or the reduced image path to be copied to the content location input section in response to image path selection and paste operation inputs to the operation section by the user without requiring the user to carry out an operation to refer to an image file to be uploaded through hierarchies of a folder structure.

* * * * *